United States Patent
Ishikawa et al.

(10) Patent No.: US 10,945,365 B2
(45) Date of Patent: Mar. 16, 2021

(54) MOWER CORD AND MANUFACTURING METHOD FOR MOWER CORD

(71) Applicant: Sanyo Tegusu Co., Ltd., Tokorozawa (JP)

(72) Inventors: Toshio Ishikawa, Saitama (JP); Shigeki Ichikawa, Saitama (JP); Masaya Suzuki, Saitama (JP)

(73) Assignee: Sanyo Tegusu Co., Ltd., Tokorozawa (JP)

( * ) Notice: Subject to any disclaimer, the term of this patent is extended or adjusted under 35 U.S.C. 154(b) by 0 days.

(21) Appl. No.: 15/553,866

(22) PCT Filed: Mar. 2, 2015

(86) PCT No.: PCT/JP2015/056056
§ 371 (c)(1),
(2) Date: Aug. 25, 2017

(87) PCT Pub. No.: WO2016/139710
PCT Pub. Date: Sep. 9, 2016

(65) Prior Publication Data
US 2018/0064026 A1    Mar. 8, 2018

(51) Int. Cl.
| | | |
|---|---|---|
| *B29C 43/22* | (2006.01) | |
| *A01D 34/416* | (2006.01) | |
| *B26F 1/12* | (2006.01) | |
| *B29C 55/00* | (2006.01) | |
| *B29C 43/02* | (2006.01) | |

(Continued)

(52) U.S. Cl.
CPC ......... *A01D 34/4168* (2013.01); *A01D 34/73* (2013.01); *B26F 1/12* (2013.01); *B29C 43/02* (2013.01); *B29C 43/021* (2013.01); *B29C 43/226* (2013.01); *B29C 48/00* (2019.02); *B29C 55/00* (2013.01)

(58) Field of Classification Search
None
See application file for complete search history.

(56) References Cited

U.S. PATENT DOCUMENTS

| | | | |
|---|---|---|---|
| 4,186,239 A | 1/1980 | Mize et al. | |
| 4,858,457 A | * 8/1989 | Potucek | B21B 1/163 |
| | | | 72/187 |

(Continued)

FOREIGN PATENT DOCUMENTS

| | | |
|---|---|---|
| CN | 201479592 U | 5/2010 |
| CN | 102006769 A | 4/2011 |

(Continued)

OTHER PUBLICATIONS

Omnexus, Glass Transition Temperature (Year: 2015).*

(Continued)

*Primary Examiner* — Jeffrey M Wollschlager
*Assistant Examiner* — Armand Melendez
(74) *Attorney, Agent, or Firm* — Flynn Thiel, P.C.

(57) ABSTRACT

The present invention relates to a manufacturing method for a mower cord and includes pressing a resin wire rod and plastically deforming at least part of the wire rod in an axis perpendicular direction. Work-hardening of a surface of the plastically deformed portion allows dramatic enhancement of mowing efficiency.

17 Claims, 18 Drawing Sheets

(51) Int. Cl.
  *B29C 48/00* (2019.01)
  *A01D 34/73* (2006.01)

(56) References Cited

U.S. PATENT DOCUMENTS

| | | | | |
|---|---|---|---|---|
| 4,869,055 | A * | 9/1989 | Mickelson | A01D 34/4168 56/12.7 |
| 7,370,424 | B2 | 5/2008 | Legrand | |
| 7,543,387 | B2 | 6/2009 | Legrand | |
| 7,829,002 | B2 * | 11/2010 | Legrand | A01D 34/4168 264/210.2 |
| 2005/0081389 | A1 * | 4/2005 | Legrand | A01D 34/4168 30/276 |
| 2005/0172501 | A1 * | 8/2005 | Fogle | A01D 34/4168 30/347 |
| 2005/0188547 | A1 | 9/2005 | Legrand | |
| 2011/0033703 | A1 | 2/2011 | Legrand | |

FOREIGN PATENT DOCUMENTS

| | | |
|---|---|---|
| CN | 201947663 U | 8/2011 |
| JP | 6-33780 Y2 | 6/1991 |
| JP | 2003-230312 A | 8/2003 |
| JP | 2005-528900 A | 9/2005 |
| JP | 2007-135418 A | 6/2007 |
| JP | 3149886 U | 4/2009 |
| JP | 2012-191913 A | 10/2012 |
| WO | 9743469 A1 | 11/1997 |
| WO | WO 03/103373 A1 | 12/2003 |

OTHER PUBLICATIONS

International Search Report issued in Application No. PCT/JP2015/056056 with English translation, dated Jun. 9, 2015 (5 pages).
Written Opinion of International Searching Authority issued in Application No. PCT/JP2015/056056 dated Jun. 9, 2015 (4 pages).
Office Action of Chinese Patent Office issued in Chinese Application No. 201580077015.0 dated Feb. 1, 2019 (8 pages).
Chinese Office Action issued in corresponding Chinese Application No. 201580077015.0 dated May 12, 2020 (7 pages).
Zhang Yulong et al. "Commonly used thermosetting plastics and their molding technology" Zhejiang Science and Technology Press, Section 4 Unsaturated Polyester Plastic, with partial English translation, 2004, (8 pages).

* cited by examiner

[Figure 1]
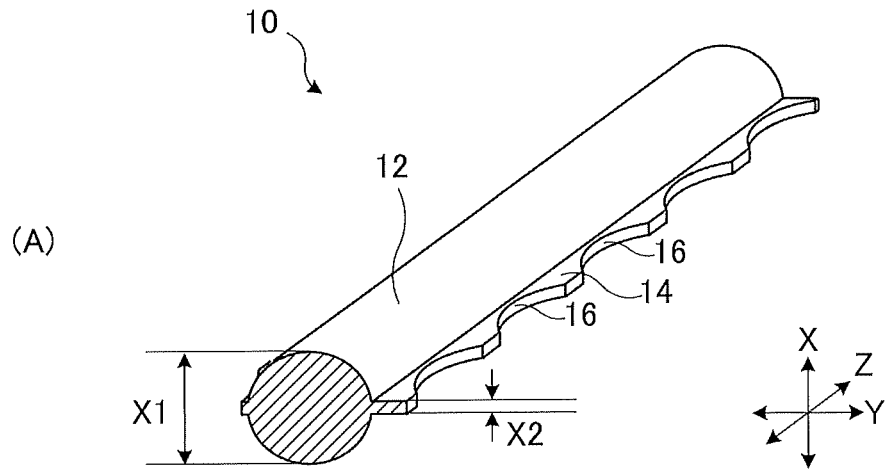
(A)
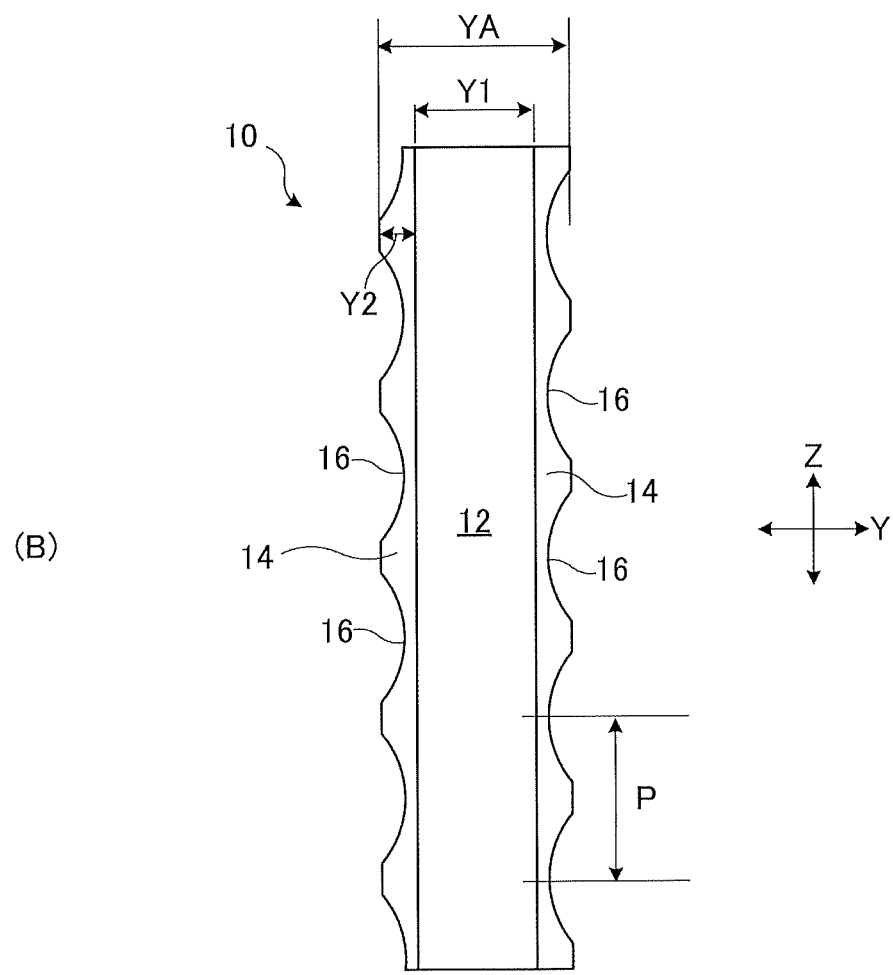
(B)

[Figure 2]
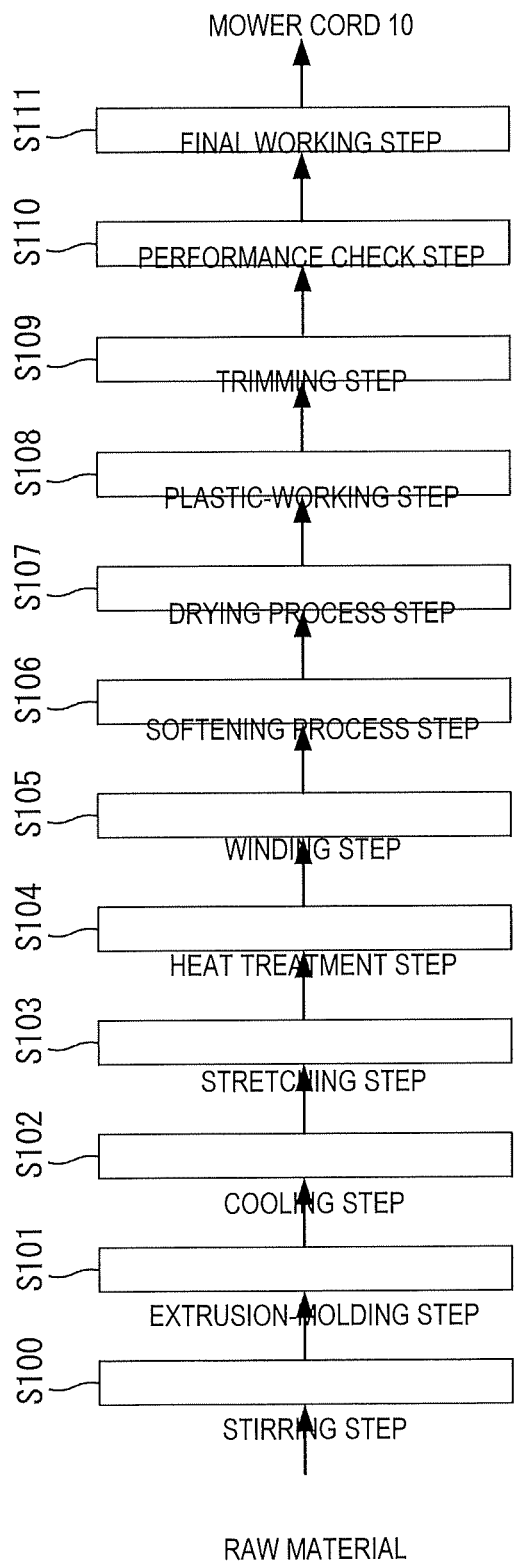

[Figure 3]
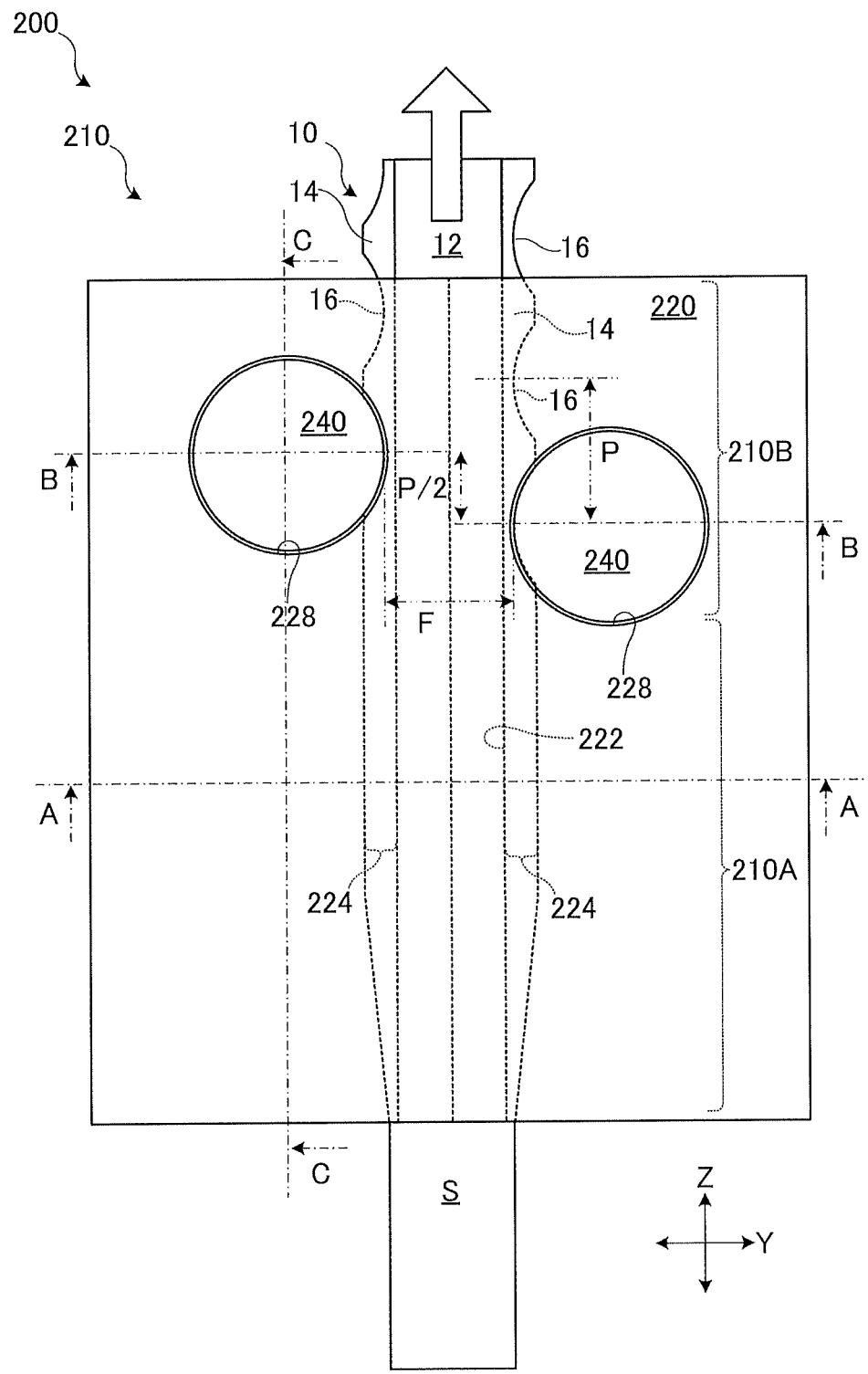

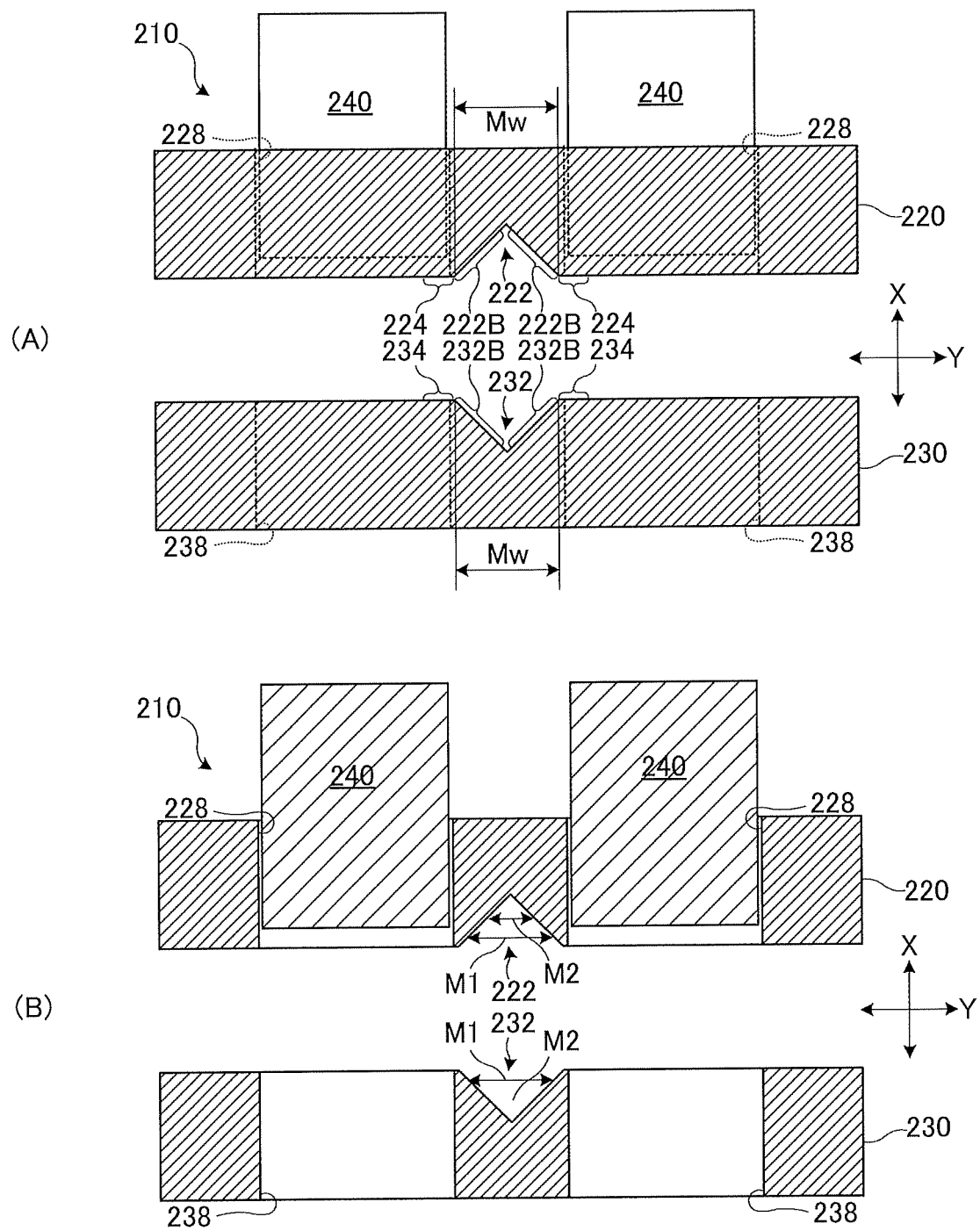
[Figure 4]

[Figure 5]
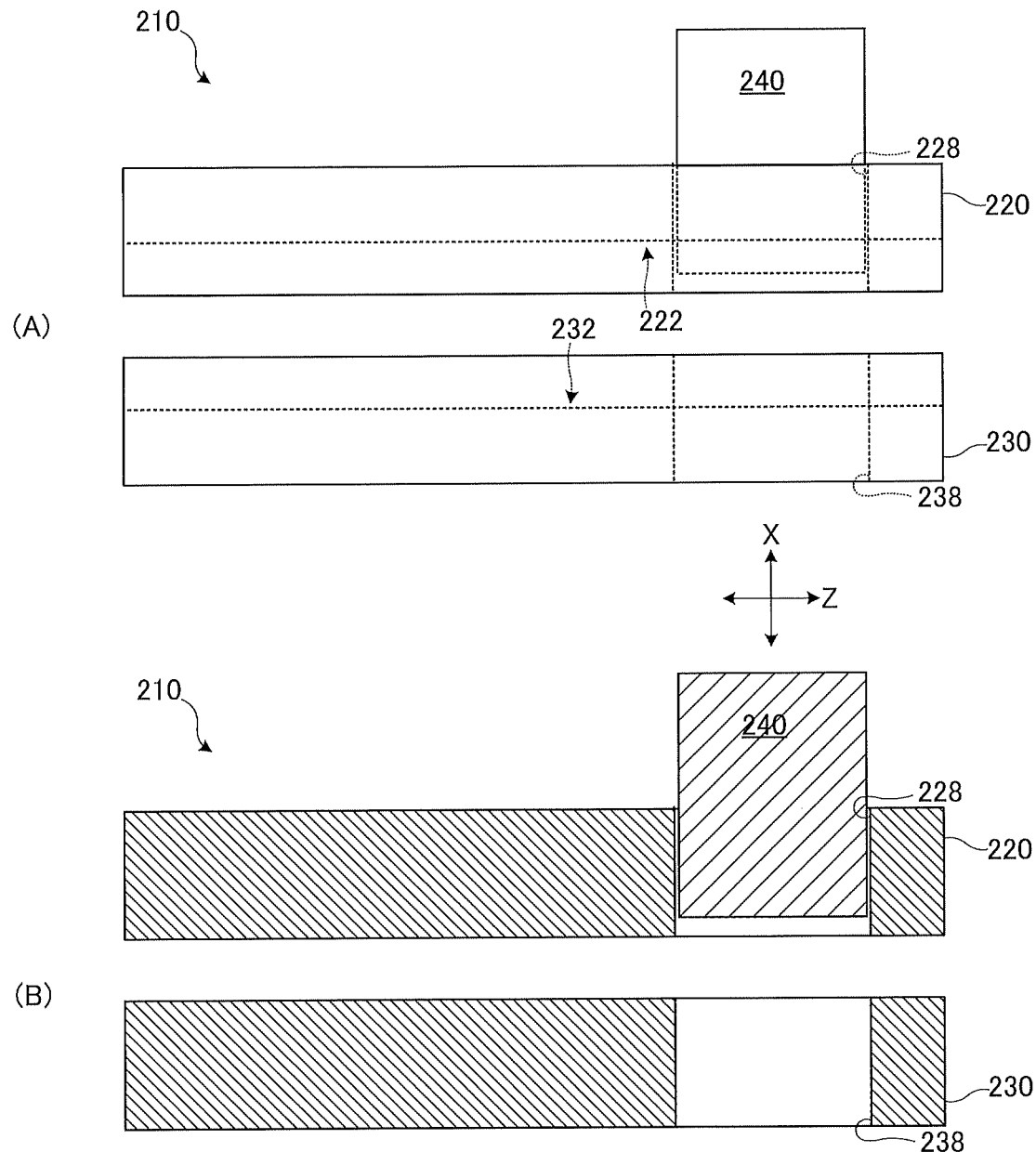

[Figure 6]
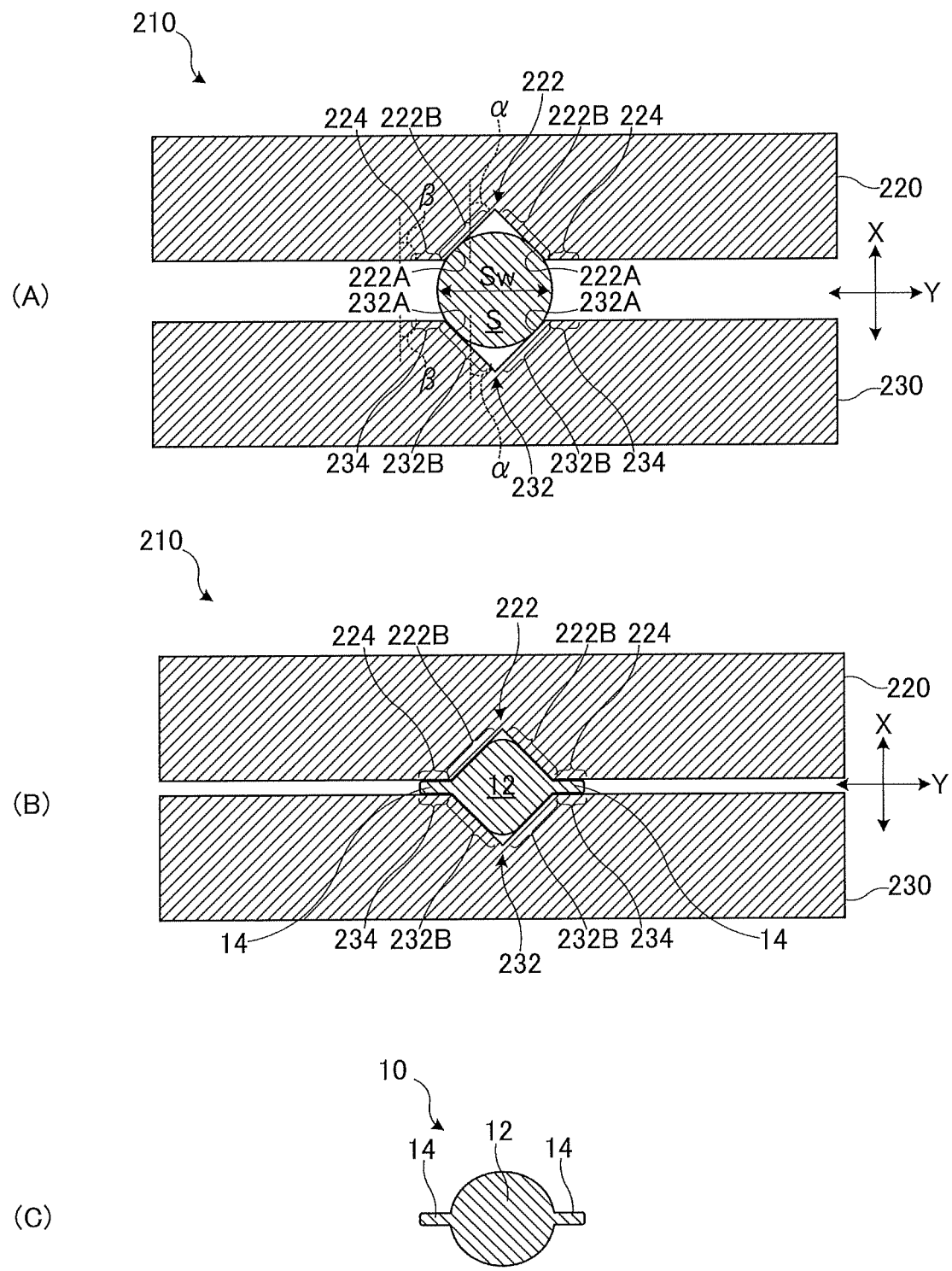

[Figure 7]
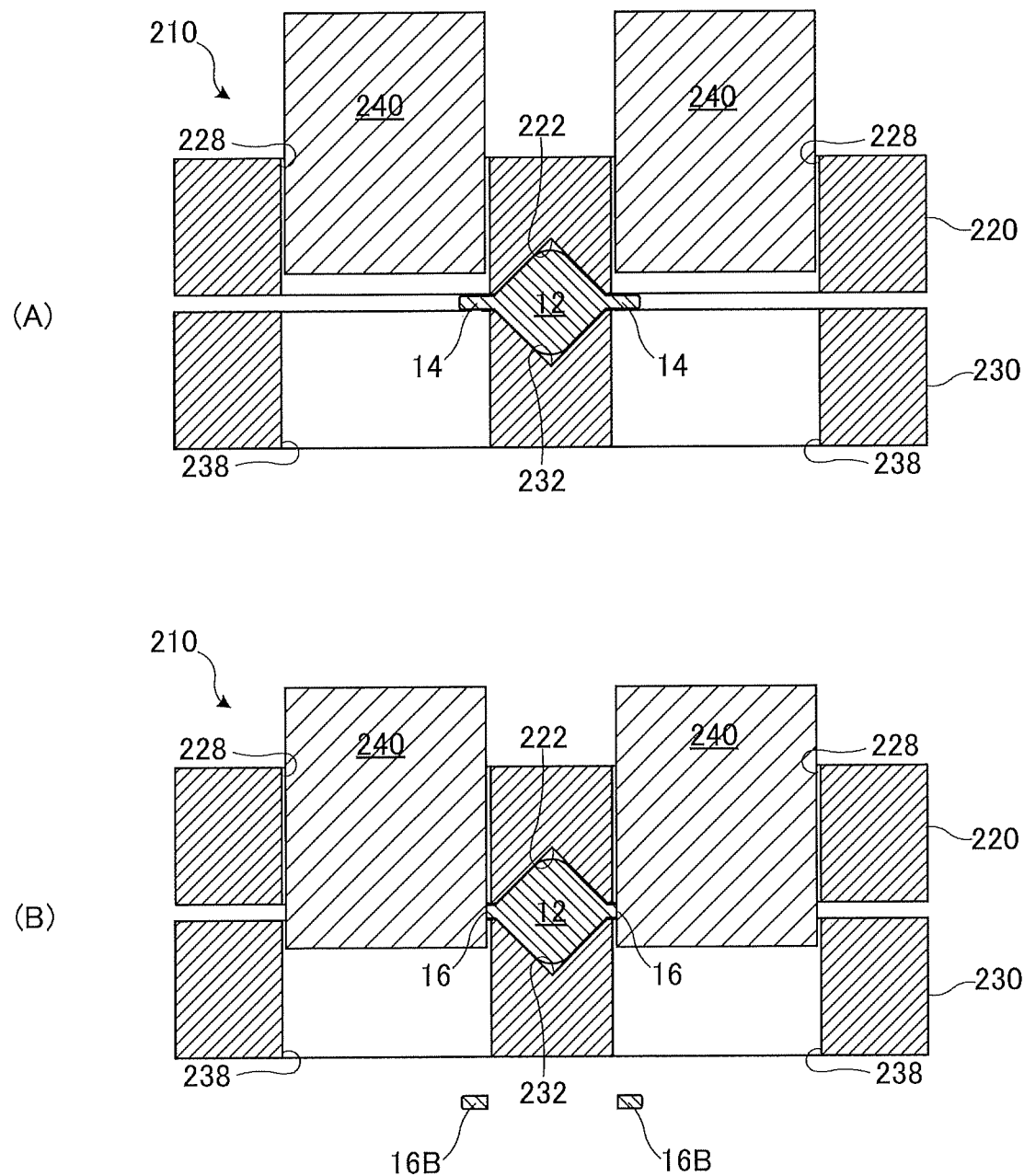

[Figure 8]
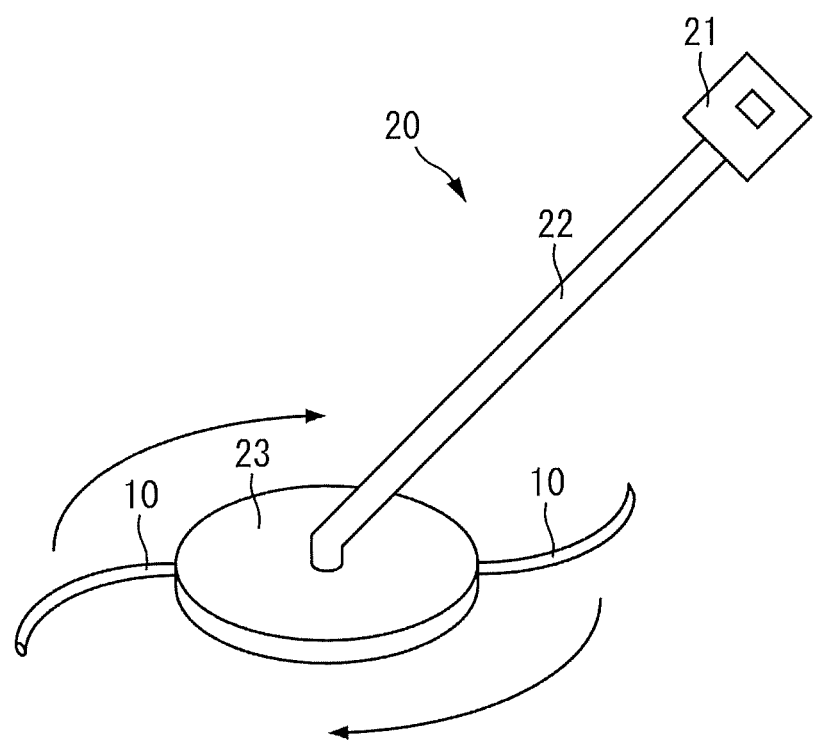

[Figure 9]
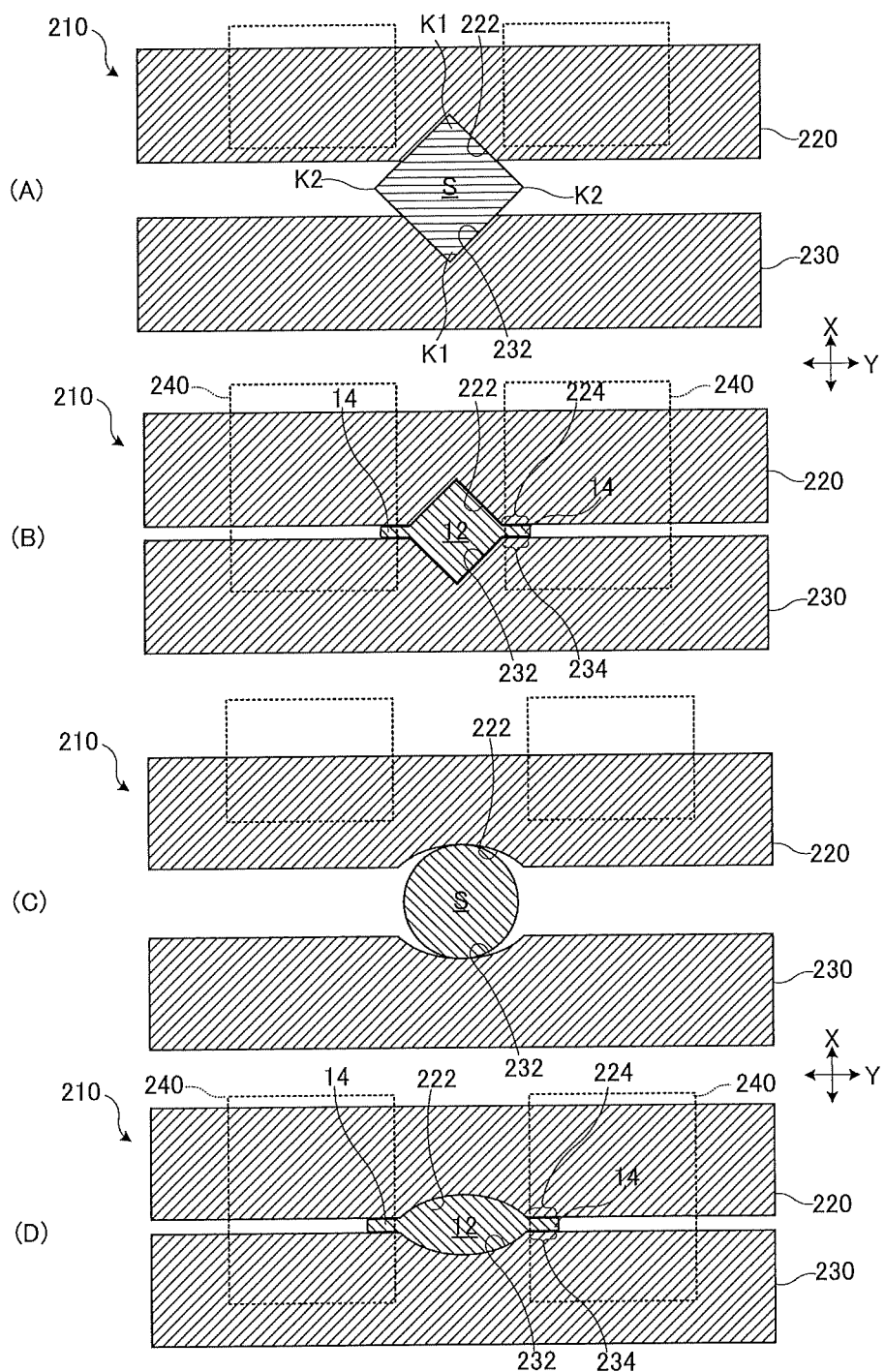

[Figure 10]
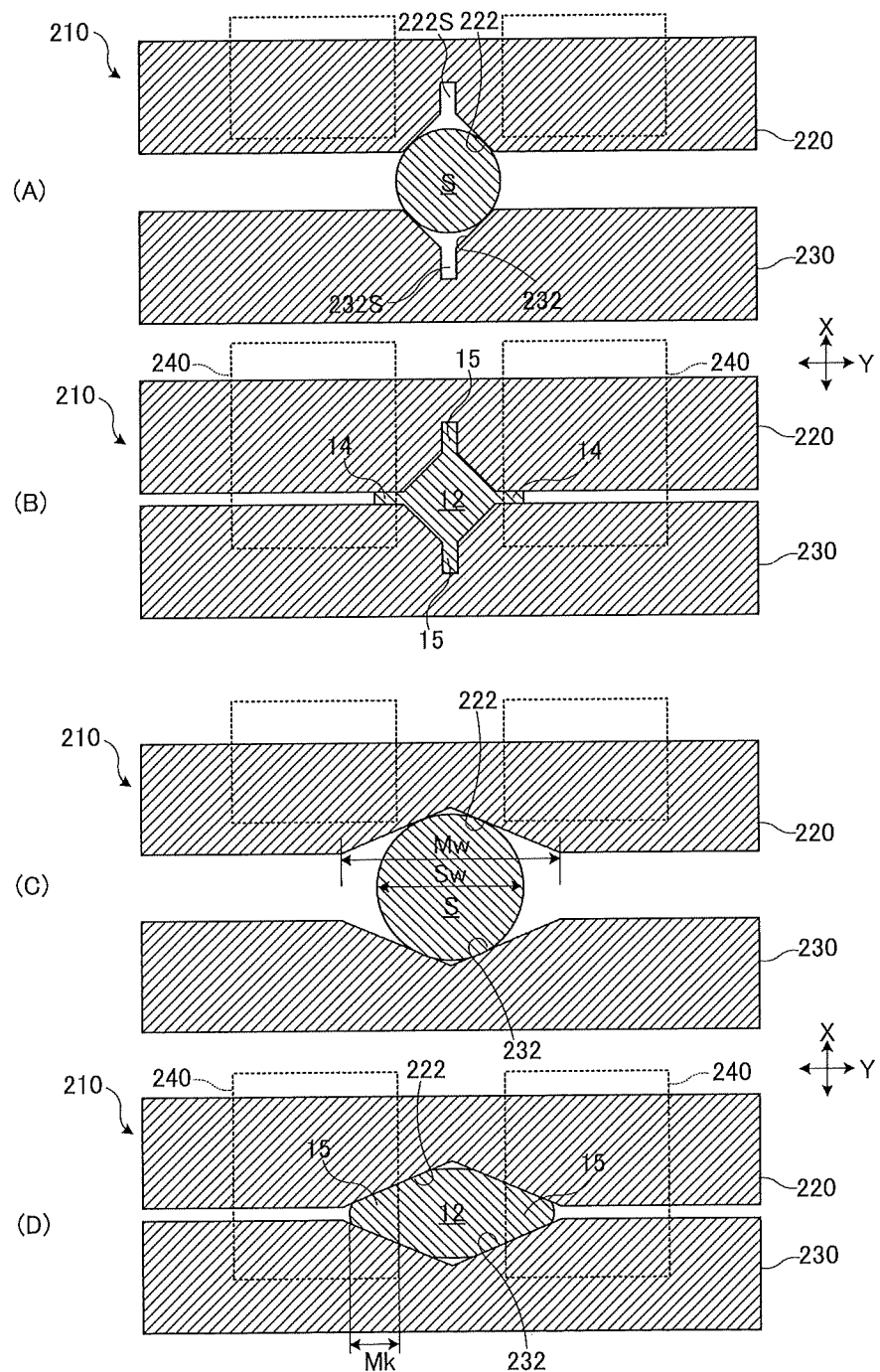

[Figure 11]
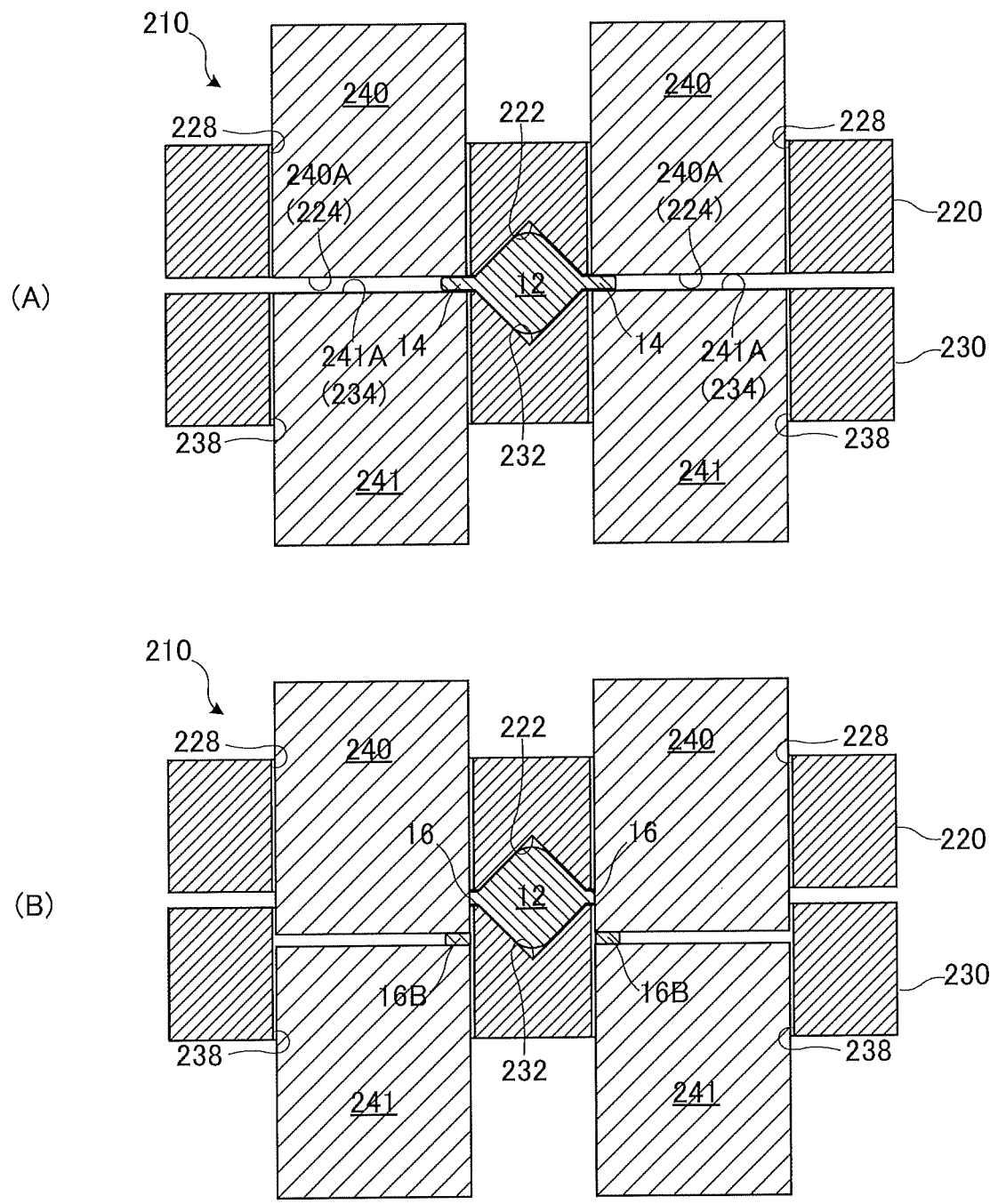

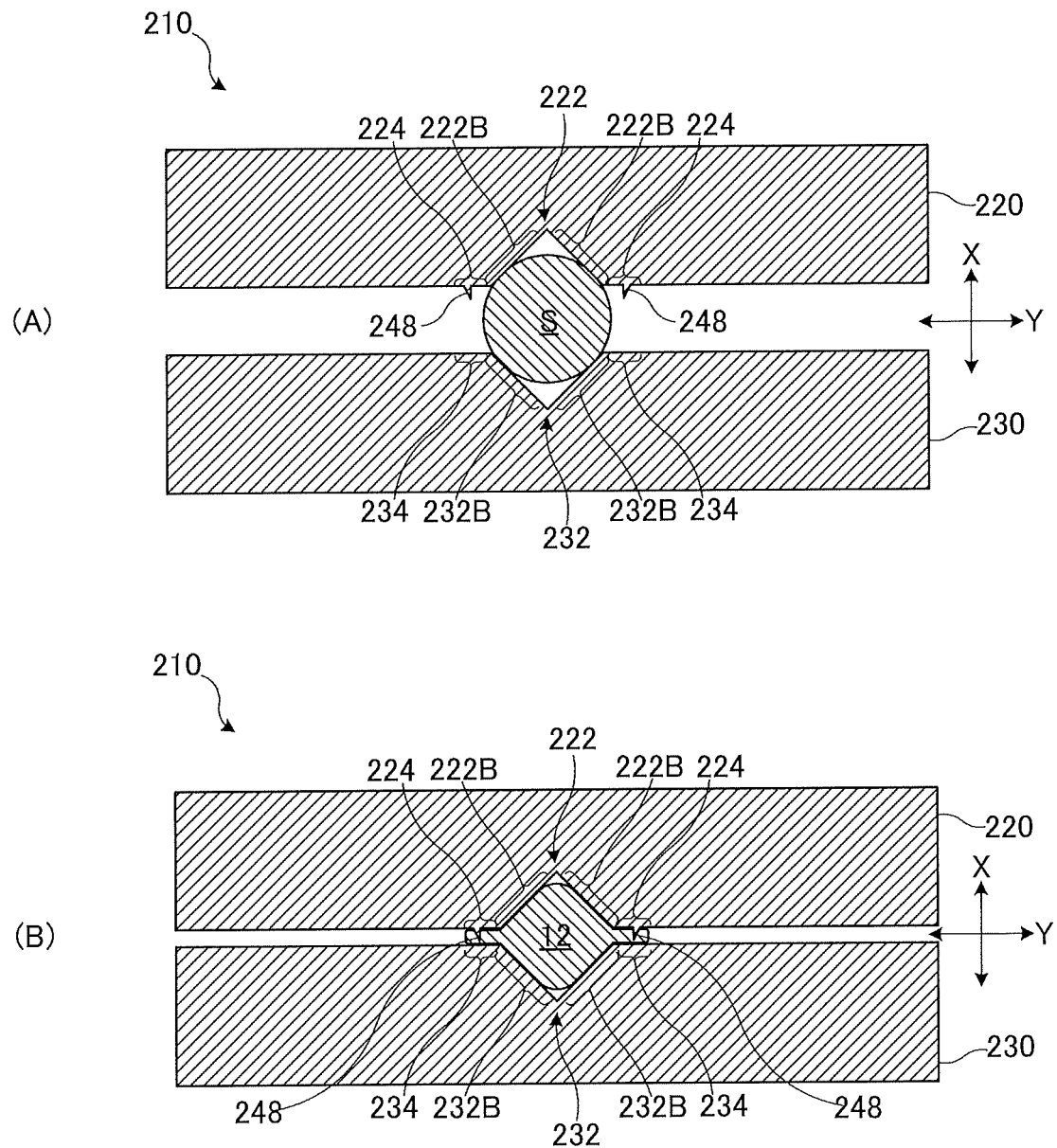
[Figure 12]

[Figure 13]
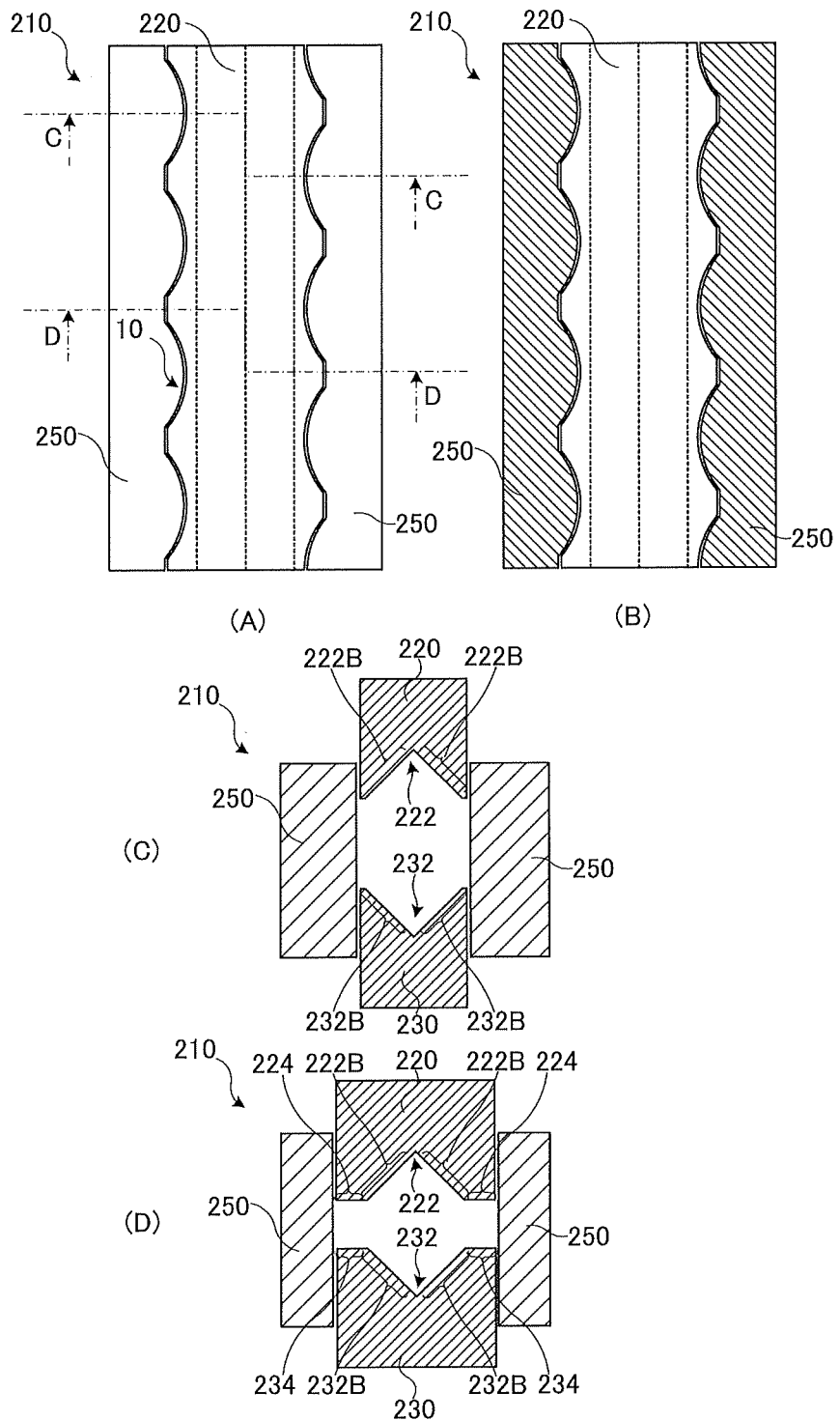

[Figure 14]
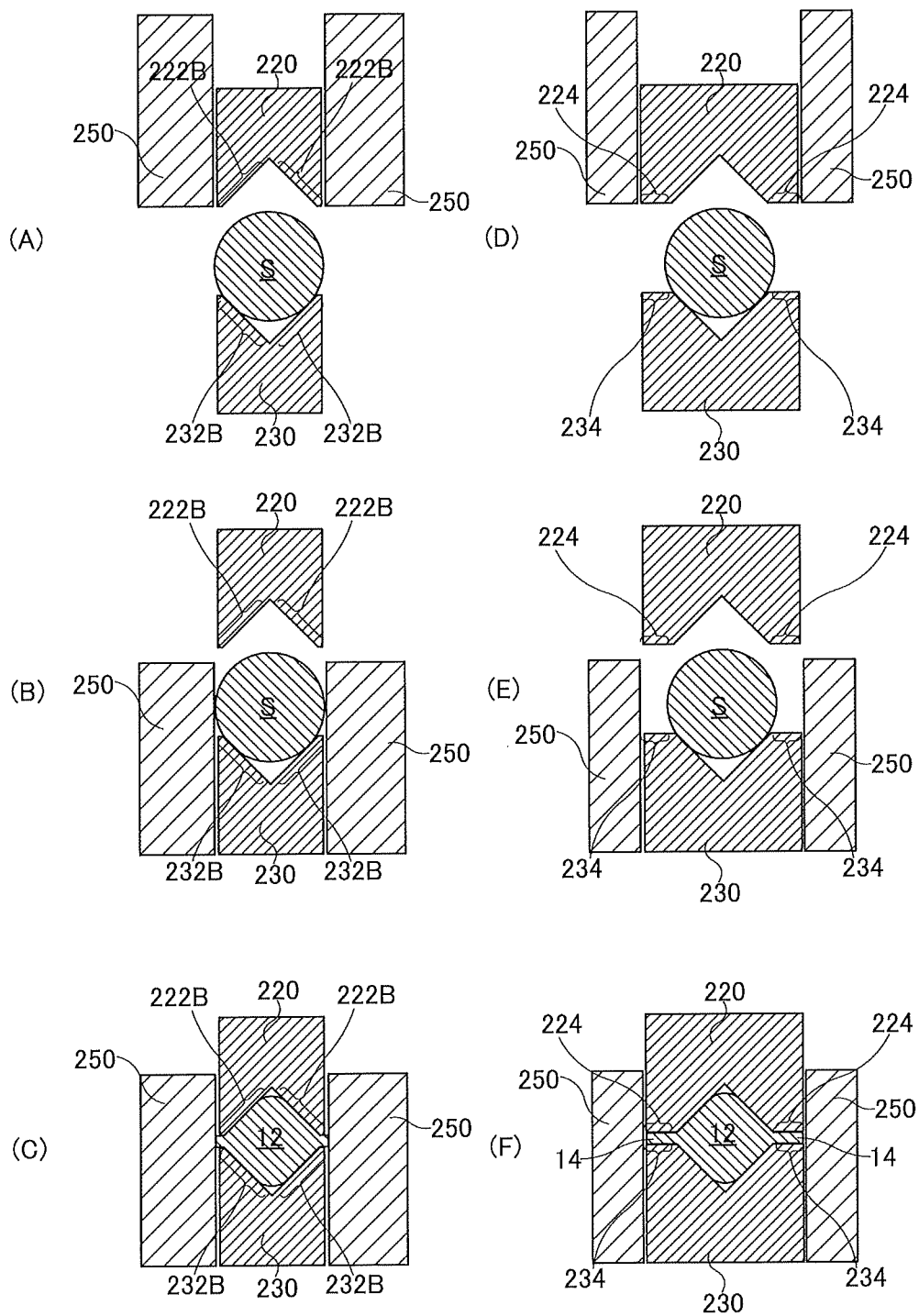

[Figure 15]
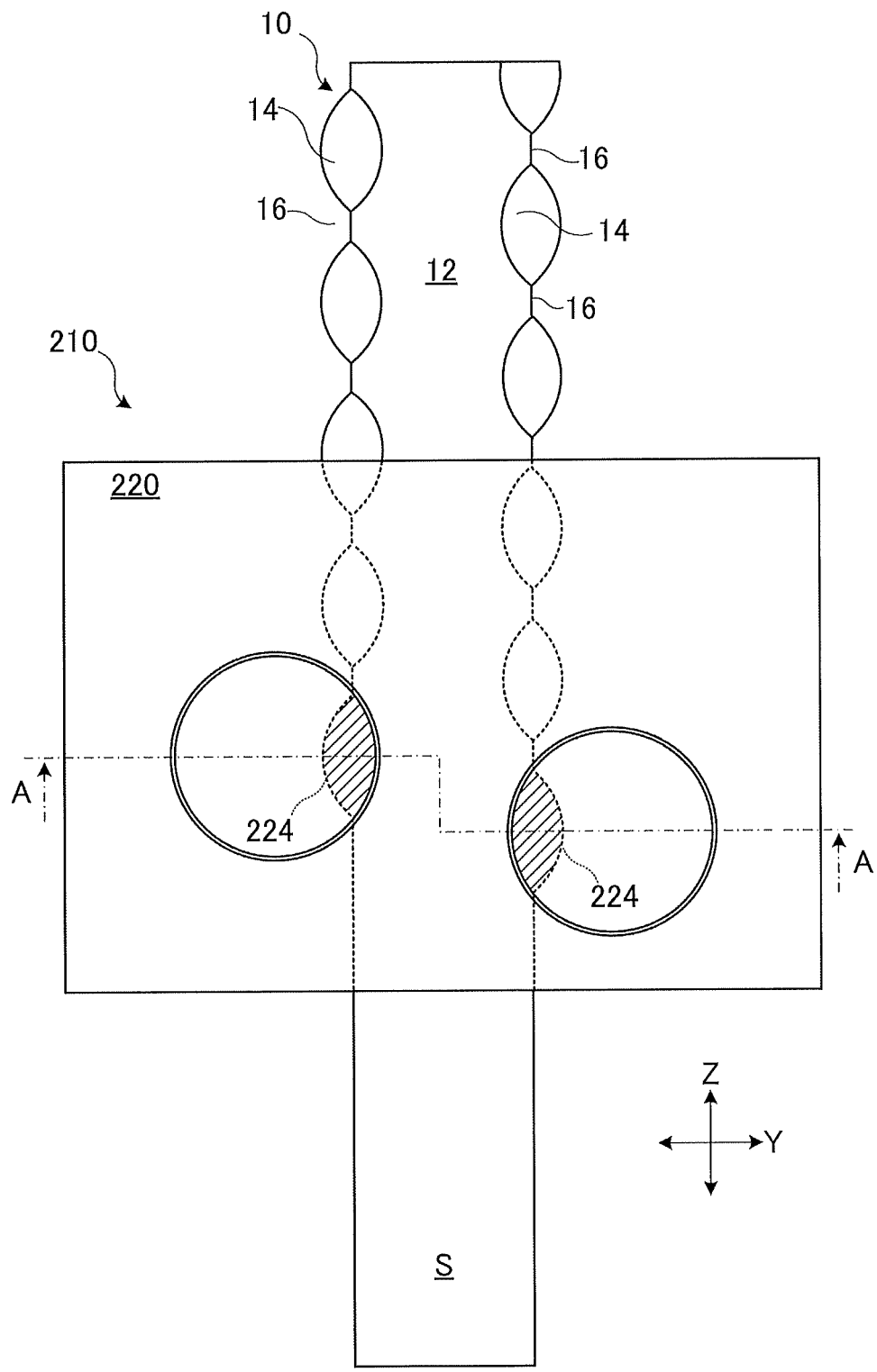

[Figure 16]
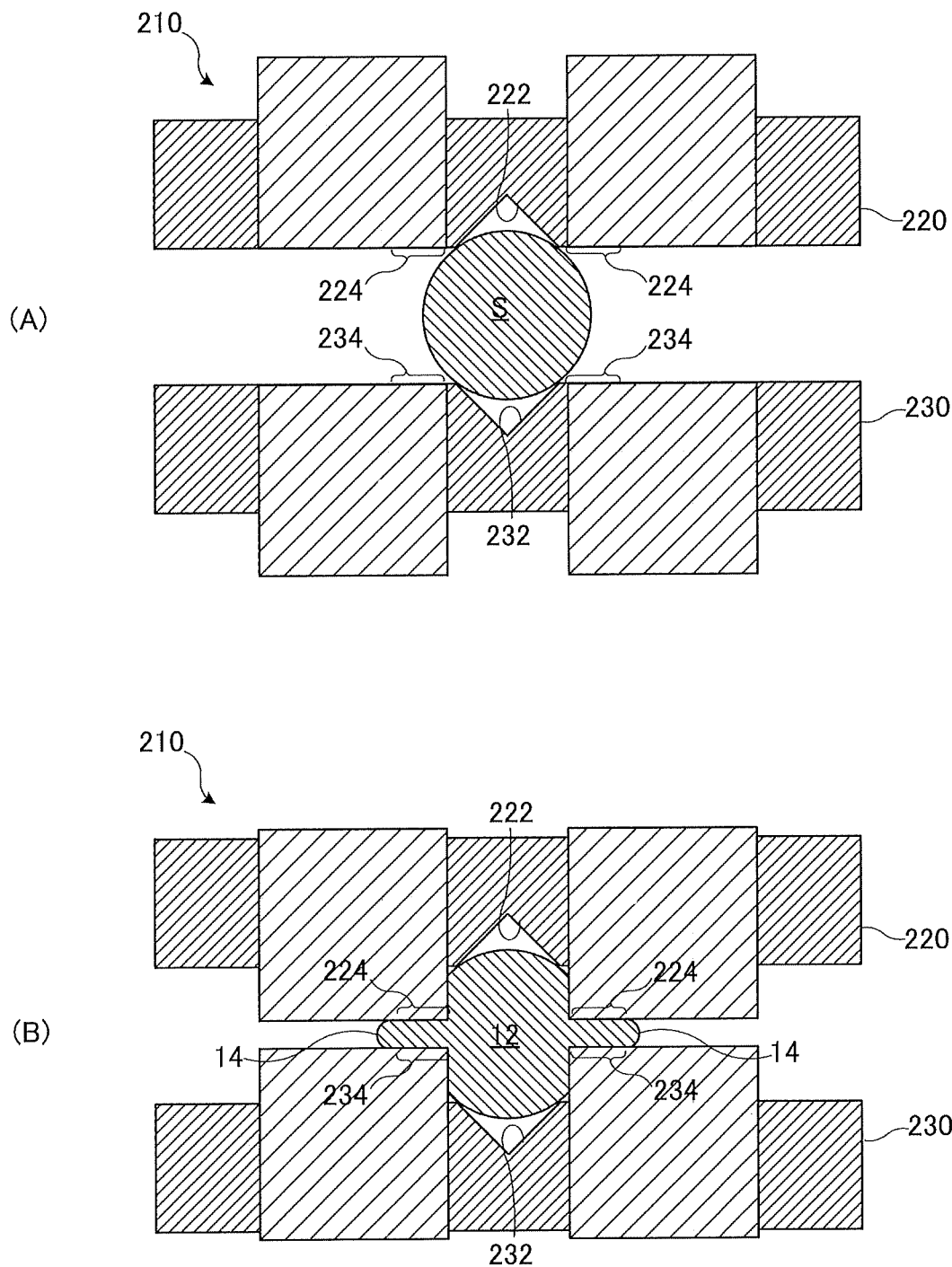

[Figure 17]
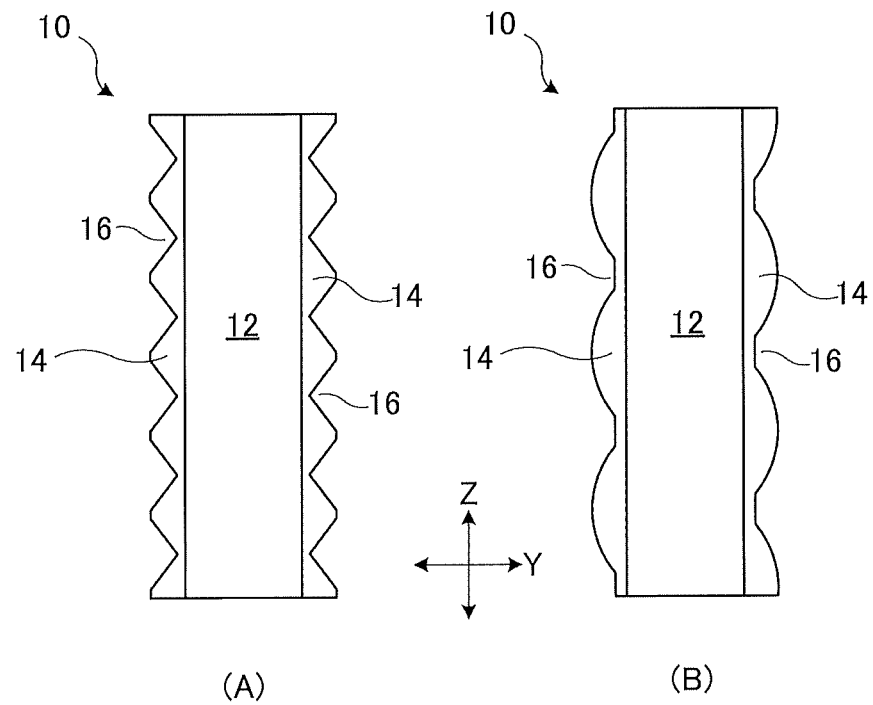
(A)　　　　　　　　(B)
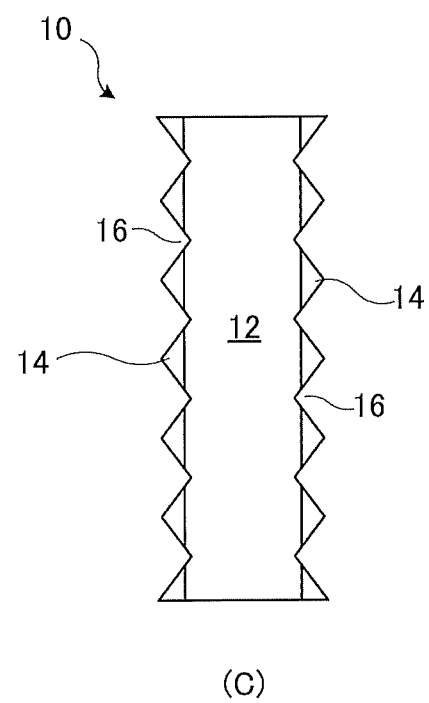
(C)

[Figure 18]
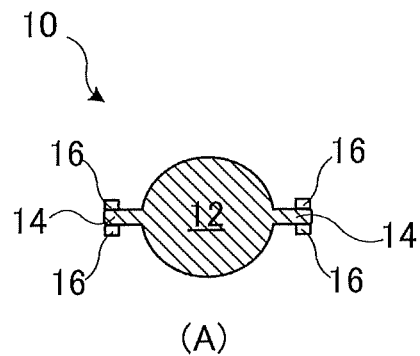
(A)
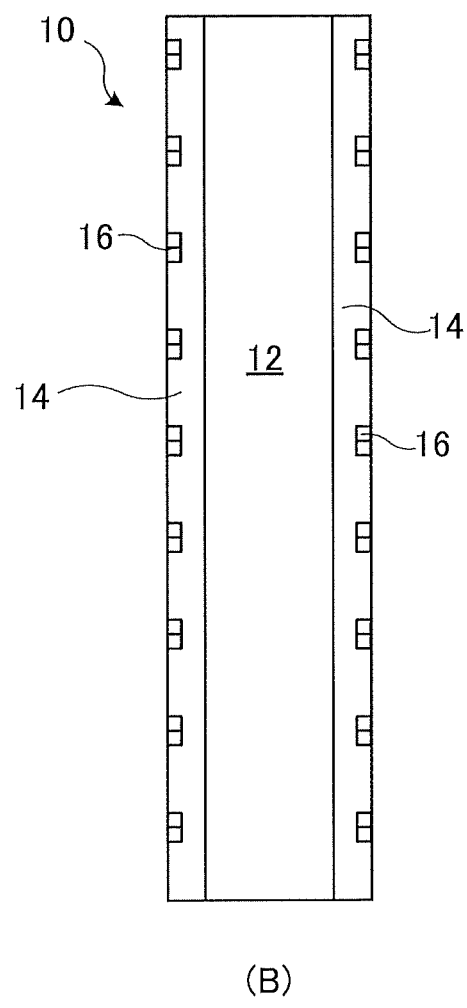
(B)
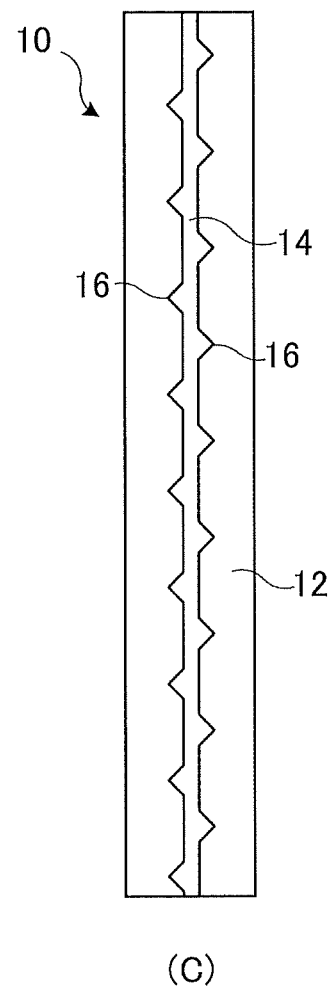
(C)

MOWER CORD AND MANUFACTURING METHOD FOR MOWER CORD

TECHNICAL FIELD

The present invention relates to a mower cord or the like used in a cord type mowing apparatus.

BACKGROUND ART

There has recently been known a nylon cord which is used while being attached to an outer periphery of a rotating component, such as a disc, in a mowing apparatus (see, for example, Japanese Patent Laid-Open No. 2007-135418). The nylon cord cuts away grass while whirling due to rotation of the rotating component and is coming into widespread use instead of a metallic rotary blade. The nylon cord is not sharp in comparison with a metallic rotary blade, and even contact of a human body with the whirling nylon cord is unlikely to result in serious injury. The nylon cord can be replaced in accordance with the extent of breakage or abrasion and is easy to replace.

To improve the mowing capability of such a nylon cord, the idea of making a cross-section in an axis perpendicular direction (a transverse section) quadrangular or rhombic, or the idea of forming uneven portions in a longitudinal direction in a cross-section in an axis direction (a longitudinal section) has been proposed (see, for example, Japanese Patent Laid-Open No. 2003-230312). With this configuration, a nylon cord is likely to bite into grass and has the enhanced effect of cutting grass.

Note that a nylon cord may break and scatter or may become unnecessary after replacement and be discarded, and may be left there. In this case, the nylon cord does not decompose spontaneously and is almost permanently left. Under the circumstances, use of a cord made of biodegradable plastic that decomposes spontaneously instead of a nylon cord is proposed from the viewpoint of environmental conservation (see, for example, Japanese Patent Laid-Open No. 2012-0191913).

SUMMARY OF INVENTION

Technical Problem

A nylon cord is manufactured by extruding and molding a resin raw material and then stretching the material. To make a transverse section quadrangular or rhombic, the shape of a hole of a die at the time of extrusion molding may be made quadrangular or rhombic. However, uneven portions continuous in a longitudinal direction of the cord cannot be formed in the extrusion-molding step and the stretching step.

To form uneven portions in the longitudinal direction of the nylon cord, the cord after stretching needs to be sheared such that the cord is partially notched. The strength of a notched portion of the cord decreases and is prone to breakage. Additionally, uneven portions are likely to abrade during mowing.

Assume a case where a rod-like member having uneven portions in a longitudinal direction is directly made using an injection die and is used as a mower cord. Since the cord has not undergone stretching and is insufficient in elasticity and strength, the cord is useless as a mower cord.

A cord manufactured using biodegradable plastic is likely to have lower rigidity (i.e., softer) than a normal nylon cord. A mower cord beats and cuts grass during rotation and is required to have a given degree of rigidity. If biodegradable plastic is used as the material for the mower cord, there is fear that mowing efficiency decreases somewhat. If uneven portions are formed at a cord manufactured using biodegradable plastic through shearing, the cord is likely to have even lower strength.

The present invention has been made in view of the above-described problems, and has as its object to provide a mower cord capable of dramatically enhancing mowing efficiency.

Solution to Problem

According to the present invention that attains the above-described object, there is provided a manufacturing method for a mower cord, including pressing a resin wire rod and plastically deforming at least part of the wire rod in an axis perpendicular direction.

In connection with the above-described manufacturing method, a cross-sectional shape of the wire rod may be changed to an imperfect circular shape by the plastically deforming.

In connection with the above-described manufacturing method, a site where the at least part of the wire rod is plastically deformed may have a flat portion which is thinner in a pressing direction than the wire rod before the pressing.

In connection with the above-described manufacturing method, the site where the at least part of the wire rod is plastically deformed may have an extended portion which expands on an outer side in a radial direction of the wire rod before the pressing.

In connection with the above-described manufacturing method, an outer edge in the radial direction of the flat portion or the extended portion may have a ridge which extends in a longitudinal direction of the wire rod.

In connection with the above-described manufacturing method, a plurality of uneven portions which are continuous in the longitudinal direction of the wire rod may be formed at the site where the at least part of the wire rod is plastically deformed.

In connection with the above-described manufacturing method, the uneven portions may be formed by trimming off part of the plastically deformed site.

In connection with the above-described manufacturing method, the wire rod may be made by stretching a resin material.

In connection with the above-described manufacturing method, a cross-section in the axis perpendicular direction of the wire rod may have any one of a circular shape, an elliptical shape, a rectangular shape, and a rhombic shape.

In connection with the above-described manufacturing method, the at least part of the wire rod may be plastically deformed by pressing the wire rod with a pressure die.

In connection with the above-described manufacturing method, the pressure die may have a groove which stores the wire rod, and the wire rod may be pressed while the wire rod is held by the groove.

In connection with the above-described manufacturing method, the groove may come into contact with a place on an inner side in a width direction of the wire rod.

In connection with the above-described manufacturing method, the pressure die may have pressing surfaces which are continuous on outer sides in the width direction of the groove, and the wire rod may be pressed by the pressing surfaces while the wire rod is held by the groove.

In connection with the above-described manufacturing method, the pressure die may have a tapered surface which comes into contact with the wire rod.

According to the present invention that attains the above-described object, there is provided a mower cord manufactured by any one of the above-described manufacturing methods.

According to the present invention that attains the above-described object, there is provided a mower cord including a cord-like main body portion, and flat portions which are continuous on outer sides in a radial direction of the main body portion and are molded to be thinner than the main body portion through plastic deformation.

In connection with the above-described mower cord, a plurality of uneven portions may be provided along a longitudinal direction of the main body portion by the flat portions.

In connection with the above-described mower cord, the uneven portions may be formed by trimming off part of the flat portions.

In connection with the above-described mower cord, surfaces of the flat portions may be harder than a surface of the main body portion.

In connection with the above-described mower cord, the main body portion may be obtained by stretching a resin material.

In connection with the above-described mower cord, a cross-section in an axis perpendicular direction of the main body portion may have any one of a circular shape, an elliptical shape, a rectangular shape, and a rhombic shape.

In connection with the above-described mower cord, the mower cord may be made of biodegradable resin.

In connection with the above-described mower cord, glass wool may be mixed in the mower cord.

Advantageous Effect of Invention

The present invention allows dramatic enhancement of mowing efficiency.

BRIEF DESCRIPTION OF DRAWINGS

FIG. 1(A) is a partial perspective view showing part of a mower cord according to the present invention, and FIG. 1(B) is a partial plan view of the cord.

FIG. 2 is a flowchart showing a production process for the mower cord.

FIG. 3 is a plan view showing the configuration of a die used for production of the mower cord.

FIG. 4(A) is a cross-sectional view of the die taken along line A-A in FIG. 3, and FIG. 4(B) is a cross-sectional view of the die taken along line B-B in FIG. 3.

FIG. 5(A) is a side view showing the configuration of the die, and FIG. 5(B) is a side cross-sectional view.

FIG. 6(A) is a front cross-sectional view showing the states of the die and the mower cord before plastic working, FIG. 6(B) is a front cross-sectional view showing the states of the die and the mower cord after plastic working, and FIG. 6(C) is a front cross-sectional view of the mower cord after completion of a plastic-working step.

FIG. 7(A) is a front cross-sectional view showing the states of the die and the mower cord before trimming, and FIG. 7(B) is a front cross-sectional view showing the states of the die and the mower cord after trimming.

FIG. 8 is a usage state view showing a state in which the mower cord is attached to a mowing apparatus.

FIGS. 9(A) to 9(D) are front cross-sectional views showing other examples of the die and the mower cord.

FIGS. 10(A) to 10(D) are front cross-sectional views showing other examples of the die and the mower cord.

FIGS. 11(A) and 11(B) are front cross-sectional views showing another example of the die.

FIGS. 12(A) and 12(B) are front cross-sectional views showing another example of the die.

FIG. 13(A) is a plan view showing another example of the die, FIG. 13(B) is a plan partial cross-sectional view, FIG. 13(C) is a front cross-sectional view taken along line C-C in FIG. 13(A), and FIG. 13(D) is a front cross-sectional view taken along line D-D in FIG. 13(A).

FIGS. 14(A) to 14(C) are front cross-sectional views showing an aspect in which the mower cord is plastically deformed in a cross-section in FIG. 13(C), and FIGS. 14(D) to 14(F) are front cross-sectional views showing an aspect in which the mower cord is plastically deformed in a cross-section in FIG. 13(D).

FIG. 15 is a plan view showing other examples of the die and the mower cord.

FIGS. 16(A) and 16(B) are front cross-sectional views taken along line A-A in FIG. 15.

FIGS. 17(A) to 17(C) are plan views showing other examples of the mower cord.

FIGS. 18(A), 18(B), and 18(C) are a front cross-sectional view, a plan view, and a side view, respectively, showing another example of the mower cord.

DESCRIPTION OF EMBODIMENT

A mower cord according to the present invention will be described below in detail with reference to the drawings.

A mower cord 10 shown in FIG. 1 is used to mow not only grass, such as a lawn, ridge grass, and weeds, but also various plants and trees, such as bamboo grass and twigs. The material for the mower cord 10 is, for example, resin, and a monofilament of synthetic resin is a representative example.

The mower cord 10 includes a cord-like main body portion 12 and flat portions 14 which are obtained through plastic deformation and are thinner than the main body portion 12. The flat portion 14 is flatter than a wire rod S (see FIG. 2) before plastic deformation of the mower cord 10. Note that the flat portion 14 can also be defined as an extended portion which is expanded and formed so as to protrude from the main body portion 12 toward an outer side in a radial direction. The cross-sectional shape in an axis perpendicular direction of the mower cord 10 is changed to an imperfect circular shape by the plastic deformation.

The wire rod S is obtained by stretching a resin material. The material for the wire rod S is obtained by, e.g., melt-spinning and stretching a polyamide, such as nylon 6, nylon 66, nylon 610, or nylon 11, a polyester, such as polyethylene terephthalate or polybutylene terephthalate, a polyolefin, such as polyethylene or polypropylene, a polyhalogenated hydrocarbon, such as polyvinylidene chloride, polyether, or one of copolymers based thereon. A biodegradable plastic, such as polylactic acid, polycaprolactone, polyhydroxyalkanoate, polyglycolic acid, modified polyvinyl alcohol, casein, modified starch, or a PET copolymer, can also be used as a preferred material. If a biodegradable plastic is stretched into the form of a cord, the cord is likely to have insufficient elasticity, and mowing efficiency is likely to decrease. The mowing efficiency is enhanced by work-hardening a surface through plastic deformation and forming uneven portions, as will be described later. This allows compensation for shortcomings of the material. It is preferable to improve properties, such as abrasion resistance, by mixing glass wool into one of the above-described raw materials.

The main body portion 12 has a circular or elliptical cross-section, which is close to an elliptical shape here. The main body portion 12 is obtained by applying pressure on the wire rod S perfectly circular in cross-section to plastically deform the wire rod S into an elliptical shape. A thickness (height) X1 in a pressure-application direction X of the main body portion 12 is about 3 mm, and a thickness (width) Y1 in a direction (a pressure-application perpendicular direction Y) perpendicular to the pressure-application direction X and a longitudinal direction Z is about 3 mm. Each flat portion 14 protrudes in the pressure-application perpendicular direction Y from the main body portion 12, a thickness (blade thickness) X2 in the pressure-application direction X is about 1 mm, and a thickness (blade width) Y2 in the pressure-application perpendicular direction Y is about 1.5 mm. Thus, the flat portion 14 is smaller than the main body portion 12 in the thickness in the pressure-application direction X. The amount of plastic deformation in the pressure-application direction X at the flat portion 14 with respect to the wire rod S is preferably about 40% to 95%, more preferably about 40% to 80%. After sufficient plastic deformation to this extent, the shape is unlikely to be restored to the original shape of the wire rod S.

One pair of flat portions 14 is formed so as to be arranged on two outer sides in the pressure-application perpendicular direction Y of the main body portion 12. As a result, a full width YA in the pressure-application perpendicular direction of the mower cord 10 is about 5 mm. Note that various dimensions are illustrative only and can be appropriately set depending on the intended use. For example, a full thickness in the pressure-application direction X of the mower cord 10 is preferably not less than 1.2 mm and not more than 4 mm, more preferably not more than 3 mm. A full thickness in the neighborhood of 1.6 mm is suitable for a lawn, and a full thickness not less than 2.0 mm and not more than 2.6 mm is suitable for ridge grass and weeds in farmland or on the roadside. A full thickness not less than 2.4 mm and not more than 4 mm is particularly preferable for ridge grass and weeds, and a full thickness of about 2.4 mm to 3 mm is more preferable. The length of the mower cord 10 is, for example, 200 mm and can be set depending on the intended use. The mower cord 10 several meters to several tens of meters long may be cut and used.

Although the details will be described later, the flat portion 14 is a site formed by significantly plastically deforming the wire rod S. A surface of the flat portion 14 is generally harder than a surface of the main body portion 12 due to, e.g., accumulation of internal strain.

A plurality of uneven portions 16 are formed along the longitudinal direction Z of the main body portion 12 at the flat portions 14. Each uneven portion 16 is an arc-shaped cut, and the uneven portions 16 are continuous in the longitudinal direction Z at predetermined uneven portion intervals P. The uneven portions 16 are formed by trimming (shearing) the flat portions 14 with a punch or the like.

A production process for the mower cord 10 will be described with reference to FIG. 2. FIG. 2 is a flowchart showing the manufacturing process for the mower cord 10.

The production process for the mower cord 10 includes a stirring step (step S100), an extrusion-molding step (step S101), a cooling step (step S102), a stretching step (step S103), a heat treatment step (step S104), a winding step (step S105), a softening process step (step S106), a drying process step (step S107), a plastic-working step (step S108), a trimming step (step S109), and a performance check step (step S110), and a final working step (step S111).

First, in the stirring step (step S100), a raw material inside a vessel is stirred. The stirred raw material is extruded through a die and is molded into the form of a string in the extrusion-molding step (step S101). The object molded in the form of a string is cooled in a cooling bath in the cooling step (step S102). The cooled object is stretched in the stretching step (step S103). The stretched object is heated in the heat treatment step (step S104). The heated object is wound around a shaft center in the winding step (step S105). The object wound around the shaft center is dipped in a plasticizer and subjected to softening in the softening process step (step S106). The object subjected to the softening is heated and subjected to drying in the drying process step (step S107). The object subjected to the drying serves as the wire rod S. In the plastic-working step (step S108), the wire rod S is plastically deformed through press working using a pressure die to form the main body portion 12 and the flat portions 14. In the trimming step (step S109), the uneven portions 16 are formed at the flat portions 14 by a punch. After that, in the performance check step (step S110), the object is subjected to a performance check on strength, dimensions, and the like. The object subjected to the performance check is made into the mower cord 10 as a product by, e.g., cutting the object to a desired length in the final working step (step S111). Note that the stretching step (step S103) and the heat treatment step (step S104) may be appropriately repeated a plurality of times before the winding step (step S105). Note that the material can be further hardened through rapid heating after the plastic-working step (step S108).

A working apparatus 200 used in the plastic-working step (step S108) and the trimming step (step S109) will be described with reference to FIGS. 3 to 5.

FIGS. 3 to 5 show a die 210 which is set in a press machine of the working apparatus 200. The die 210 has a first pressure die 220, a second pressure die 230, and a plurality of (two here) punches 240. The die 210 applies pressure on the wire rod S while holding the wire rod S sandwiched between the first pressure die 220 and the second pressure die 230, thereby plastically deforming at least part of the wire rod S and forming the flat portions 14. The uneven portions 16 are formed by trimming part of the flat portions 14 of the wire rod S with the punches 240. As shown in FIG. 3, in the die 210, a region where part of the wire rod S is to be plastically deformed is defined as a plastic-working region 210A while a region where trimming by the punches 240 is to be performed is defined as a trimming region 210B.

As shown in FIG. 4, the first pressure die 220 has a groove 222 which stores at least part of the wire rod S, one pair of pressing surfaces 224 which are continuous on two outer sides in a width direction (the pressure-application perpendicular direction Y) of the groove 222, and sliding holes 228, in which the punches 240 slide along the pressure-application direction X.

The groove 222 primarily holds the wire rod S by storing part of the wire rod S such that the wire rod S does not move at the time of pressure application in a sandwiched state. Of course, the groove 222 can also plastically deform the wire rod S. A maximum width Mw in the pressure-application perpendicular direction Y of the groove 222 is set to be smaller than a maximum width Sw (see FIG. 6) of the wire rod S in the pressure-application perpendicular direction Y.

Contact points, contact lines, or contact surfaces (contact lines 222A or contact surfaces 222B (see FIG. 6) in the present embodiment) at which the groove 222 is to come into contact with the wire rod S are set on an inner side in a width direction (defined as the pressure-application perpendicular direction Y) of the wire rod S.

The groove 222 of the first pressure die 220 has tapered surfaces which tilt with respect to the pressing direction X at portions which are to come into contact with the wire rod S. That is, the contact surfaces 222B of the groove 222 serve as tapered surfaces (see FIG. 6) which tilt at an angle α with respect to the pressing direction X. In the present embodiment, the groove 222 has one pair of contact surfaces 222B, which are both tapered surfaces. The groove 222 has a V-shape. As shown in FIG. 4(B), a distance between the one pair of contact surfaces 222B in the pressure-application perpendicular direction Y is larger on the pressing side (e.g., M1) in the pressing direction X and is smaller on the side (e.g., M2) opposite to the pressing side in the pressing direction X. By holding the wire rod S with the one pair of tapered surfaces, as described above, an axis of the wire rod S can be centered along the longitudinal direction Z. Since the wire rod S inevitably bends in the stretching step and the like, working accuracy can be significantly enhanced by plastically deforming the wire rod S while performing centering.

The pressing surfaces 224 arranged on two sides of the groove 222 tilt at an angle of β with respect to the pressing direction X (see FIG. 6), and the angle β is larger than the angle α of the contact surfaces 222B of the groove 222. Note that, in the present embodiment, the angle β is 90° and that the pressing surfaces 224 are flat surfaces perpendicular to the pressing direction X. The pressing surfaces 224 plastically deform the element wire S such that part of the element wire S is crushed to form the flat portions 14. As a result, the flat portions 14 are flat plates perpendicular to the pressing direction X.

The second pressure die 230 has a groove 232 which stores at least part of the wire rod S, one pair of pressing surfaces 234 which are continuous on two outer sides in a width direction (the pressure-application perpendicular direction Y) of the groove 232, and sliding holes 238, in which the punches 240 slide along the pressure-application direction X.

The groove 232 holds the wire rod S by storing part of the wire rod S such that the wire rod S does not move at the time of pressure application in a sandwiched state and plastically deforms the wire rod S. The maximum width Mw in the pressure-application perpendicular direction Y of the groove 232 is set to be smaller than the maximum width Sw (see FIG. 6) of the wire rod S in the pressure-application perpendicular direction Y. Contact points, contact lines, or contact surfaces (contact lines 232A or contact surfaces 232B in the present embodiment) at which the groove 232 is to come into contact with the wire rod S are set on the inner side in the width direction (the pressure-application perpendicular direction Y) of the wire rod S.

Additionally, the groove 232 of the second pressure die 230 has tapered surfaces which tilt with respect to the pressing direction X at portions which are to come into contact with the wire rod S. That is, the contact surfaces 232B of the groove 232 serve as tapered surfaces which tilt at the angle α with respect to the pressing direction X (see FIG. 6). In the present embodiment, the groove 232 has one pair of contact surfaces 232B, which are both tapered surfaces. The groove 222 has a V-shape. As shown in FIG. 4(B), a distance between the one pair of contact surfaces 232B in the pressure-application perpendicular direction Y is larger on the pressing side (e.g., M1) in the pressing direction X and is smaller on the side (e.g., M2) opposite to the pressing side in the pressing direction X. By holding the wire rod S with the one pair of tapered surfaces, as described above, the axis of the wire rod S can be centered along the longitudinal direction Z. Since the wire rod S inevitably bends in the stretching step and the like, working accuracy can be significantly enhanced by plastically deforming the wire rod S while performing centering.

The pressing surfaces 234 arranged on two sides of the groove 232 tilt at the angle β with respect to the pressing direction X (see FIG. 6), and the angle β is larger than the angle α of the contact surfaces 232B of the groove 232. Note that, in the present embodiment, the angle β is 90° and that the pressing surface 234 are flat surfaces perpendicular to the pressing direction X. The pressing surfaces 234 plastically deform the element wire S such that part of the element wire S is crushed to form the flat portions 14.

Note that although the grooves 222 and 232 of the first pressure die 220 and the second pressure die 230 are configured to have similar shapes in the present embodiment, the present invention is not limited to this. For example, one of the pressure dies 220 and 230 may have a flat surface.

The punches 240 are installed in the respective sliding holes 228 of the first pressure die 220 and are reciprocable in the pressure-application direction X. When each punch 240 moves toward the second pressure die 220, a distal end of the punch 240 enters into the sliding hole 238 of the second pressure punch 240 (see FIG. 7). With intersection of the distal end of the punch 240 and the sliding hole 238, part of the flat portion 14 of the element wire S is sheared. Since the punch 240 has a cylindrical shape, the uneven portion 16 to be formed at the flat portion 14 has an arcuate shape. The one pair of punches 240 is arranged on the two outer sides of the grooves 222 and 223 with an interval therebetween. As shown in FIG. 3, a distance F between inner sides of the one pair of punches 240 is set to be equal to or more than the maximum widths Mw of the grooves 222 and 232 and be less than the width Sw of the wire rod S. The punches 240 as one pair are shifted from each other by a half uneven portion interval (0.5 P) in the longitudinal direction Z.

As a result, if the one pair of extended portions 12 is sheared with the one pair of punches 240 while movement in the longitudinal direction Z of the wire rod S over a distance corresponding to the uneven portion interval P is repeated, the uneven portions 16 are formed at the uneven portion intervals P at each flat portion 14, as shown in FIG. 3. The uneven portions 16 of one flat portion 14 can be shifted in the phase in the longitudinal direction Z by the half uneven portion interval of 0.5 P from those of the other flat portion 14. The shift of the uneven portions 16 of the one flat portion 14 in the phase in the longitudinal direction Z by the half uneven portion interval of 0.5 P from those of the other flat portion 14 allows avoidance of a local constriction and enhances the strength. Note that the feed of the wire rod S can be increased by arranging a plurality of punches 240 in the longitudinal direction Z or devising the distal end shape of the punch such that a single punch can form a plurality of uneven portions 16.

A plastic-working method and a trimming method for the wire rod S using the working apparatus 200 will be described.

When the wire rod S is inserted into the plastic-working region 210A of the grooves 222 and 232 of the die 210, and the first pressure die 220 and the second pressure die 230 of the die 210 are brought closer by the press machine (not shown), the wire rod S is held by the grooves 222 and 232, as shown in FIG. 6(A). At this time, the one pair of contact surfaces 222B and the one pair of contact surfaces 232B of the grooves 222 and 232 each serve as tapered surfaces which tilt to have a V-shaped cross-section, and the wire rod S is centered along the longitudinal direction Z. Since the maximum widths Mw of the grooves 222 and 232 are smaller than the maximum width S2 of the wire rod S, part of the wire rod S protrudes from the grooves 222 and 232 in the width direction.

When the first pressure die 220 and the second pressure die 230 are further brought closer in this state, part of side surfaces of the wire rod S is crushed by the pressing surfaces 224 and 234 and is expanded and stretched in the pressure-application perpendicular direction Y while the wire rod S is compressed by the grooves 222 and 232, as shown in FIG. 6(B). If the pressure application is repeated each time the element wire S is moved in the longitudinal direction Z over the distance corresponding to the interval P, as shown in FIG. 3, a region held by the grooves 222 and 232 (which may be plastically deformed) of the wire rod S serves as the main body portion 12, and regions plastically deformed under pressure from the pressing surfaces 224 and 234 serve as the flat portions 14, as shown in FIG. 6(C). The main body portion 12 has a perfect circular shape or an elliptical shape, and the flat portions 14 are in the form of a plate.

At the same time, in the trimming region 210B, the punches 240 move up and down while the first pressure die 220 and the second pressure die 230 are close to each other, i.e., while the element wire S is held and centered by the grooves 222 and 232, as shown in FIGS. 7(A) and 7(B). As a result, an arc-shaped cut is made in each flat portion 14 to form the uneven portion 16, and a cut piece 16A drops through the sliding hole 238. By repeating the trimming each time the element wire S is moved over the distance corresponding to the uneven portion interval P, the plurality of uneven portions 16 of the flat portions 14 are formed.

A mowing apparatus 20, to which the mower cord 10 is attached, will be described with reference to FIG. 8. FIG. 8 shows a state in which the mower cord 10 is attached to the mowing apparatus 20. The mowing apparatus 20 includes a handle 21 as a grip portion, a shaft 22, a proximal end portion of which is attached to the handle 21, a disc 23 which is rotatably attached to a distal end portion of the shaft 22, a power source (not shown), such as a motor, which rotates the disc 23, and the like. One or a plurality of mower cords 10 are replaceably attached to an outer periphery of the disc 23. The mower cords 10 whirl due to rotation of the disc 23 and cut away grass.

As described above, the mower cord 10 according to the present embodiment includes the cord-like main body portion 12, and the flat portions 14 that are expanded and formed on outer sides in the radial direction of the main body portion 12 through plastic deformation. With the plastic deformation, a cross-sectional shape is changed to an imperfect circular shape, and the mower cord 10 is likely to bite into grass. Since the flat portions 14 are level, the flat portions 14 function as so-called blade edges and are likely to bite into grass. Grass can be efficiently cut. Additionally, a surface of each flat portion 14 can be hardened through cold (room temperature) plastic working. As a result, cutting efficiency can be further enhanced, and abrasion resistance enhances at the same time. This allows an increase in the service life of the mower cord 10.

In addition, in the mower cord 10, a plurality of uneven portions 16 are formed along the longitudinal direction Z by trimming off part of the flat portions 14. As a result, the uneven portions 16 catch on grass and can cut grass like a so-called saw blade. Since the uneven portions 16 are formed by trimming off, through shearing, the flat portions 14 that are surface-hardened through plastic deformation in the present embodiment, a cross-section of each uneven portion 16 is also hard and is likely to bite into grass. Since the uneven portions 16 serving as a pseudo saw blade are thin, extremely high efficient mowing can be implemented.

The amount of plastic deformation of the main body portion 12 is smaller than those of the flat portions 14, and the main body portion 12 can maintain original flexibility of a stretched element wire. Advantageously, the volume of each surface-hardened flat portion 14 is smaller than that of the main body portion 12. As a result, the whole of the mower cord 10 can ensure appropriate pliability without breaking or fracturing, and the uneven portions 16 (a blade edge) can be locally hardened. This allows implementation of both an increase in service life and improvement in mowing efficiency.

In the manufacturing method according to the present embodiment, since the first and second pressure dies 220 and 230 apply pressure on the wire rod S while the grooves 222 and 232 hold the wire rod S, the form accuracy of plastic deformation can be enhanced. Additionally, contact points, contact lines, or contact surfaces, at which the grooves 222 and 232 are to come into contact with the wire rod S, are set on the inner side in the width direction of the wire rod S. If pressure is applied on the wire rod S at the contact points, the contact lines, or the contact surfaces, the wire rod S is pushed and spread in the pressure-application perpendicular direction Y. Thus, part of the wire rod S can flow in the pressure-application perpendicular direction Y and move toward the flat portions 14.

In addition, portions (i.e., the contact surfaces 222B and 232B of the grooves 222 and 232) which are to come into contact with the wire rod S of the pressure dies 220 and 230 serve as tapered surfaces which tilt with respect to the pressing direction, and the wire rod S under pressure force is automatically centered. This allows further enhancement of the form accuracy of the mower cord 10. The pressure dies 220 and 230 have the pressing surfaces 224 and 234 that are continuous on the outer sides in the width directions of the grooves 222 and 232. Since part of the wire rod S can be pressed by the pressing surfaces 224 and 234 while the wire rod S is held by the grooves 222 and 232, the flat portions 14 can be cold-worked (at room temperature) to be thinner than the main body portion 12 by the pressing surfaces 224 and 234 while the main body portion 12 is kept thick by the grooves 222 and 232.

In the present embodiment, the cross-sectional shape of the wire rod S is a perfect circular shape. At the time of manufacture of the wire rod S, a twist may generally appear. In the case of a perfect circular shape, the wire rod S can be plastically deformed without straightening the twist. That is, the wire rod S in a twisted state is plastically deformed. As a result, the wire rod S can avoid being affected by the twist.

In the present embodiment, the plastic-working step (step S108) and the trimming step (step S109) are continuously performed without inserting a winding step therebetween. This facilitates positioning when the punches 240 form the uneven portions 16 at the flat portions 14. Since the first pressure die is integral with the punches in the present embodiment, positioning accuracy can be further enhanced.

Note that in the case of a conventional manufacturing method as a reference that lets a material pass through a die having a rhombic hole while performing temperature control such that the material has fluidity in extrusion-molding fixation and a stretching step, and deforms the material such that a cross-sectional shape is a rhombic shape or the like, a flat portion is not plastically deformed at room temperature through pressure application in a sandwiched state. The manufacturing method is disadvantageous in that the material is not strengthened and that the strength is likely to decrease. Additionally, if a flat portion is formed in a separate advance step, as in the conventional method, a cord is likely to be twisted or bent. Thus, in a separate later step, positioning at the time of forming uneven portions at the flat portion is difficult, and working efficiency is likely to decrease extremely.

Note that although a case where the mower cord 10 is manufactured using the wire rod S perfectly circular in cross-section has been illustrated in the above-described embodiment, the present invention is not limited to this. For example, the wire rod S square or rhombic in cross-section can be used, as shown in FIGS. 9(A) and 9(B). In this case, pressure is applied on one pair of diagonal portions K1 of the wire rod S while the diagonal portions K1 are engaged with the grooves 222 and 232 of the die 210, thereby plastically deforming the other diagonal portions K2 with the pressing surfaces 224 and 234. In this manner, the flat portions 14 can be constructed.

Although a case where the grooves 222 and 232 are V-shaped in cross-section has been illustrated in the embodiment, the present invention is not limited to this. For example, cross-sections of the grooves 222 and 232 may each have the shape of a perfect circular arc or an elliptical arc, as shown in FIGS. 9(C) and 9(D). In this case, the wire rod S that has the shape of a perfect circle in cross-section, the shape of an ellipse in cross-section, or the like is preferably used. If the curvatures of the grooves 222 and 232 are made smaller than that of the wire rod S, contact points, contact lines, or contact surfaces, at which the grooves 222 and 232 are to come into contact with the wire rod S, are at the center in the width direction of the wire rod S. If pressure is applied on the wire rod S at the contact points, the contact lines, or the contact surfaces, the wire rod S is pushed and spread in the pressure-application perpendicular direction Y. Thus, part of the wire rod S spreads from the grooves 222 and 232 toward outer sides in the pressure-application perpendicular direction Y to constitute the flat portions 14.

Although a case where the flat portions 14 expanding in the pressure-application perpendicular direction Y are constructed by plastically deforming the wire rod S with the pressing surfaces 224 and 234 has been illustrated in the embodiment, the present invention is not limited to this. For example, flat portions 15 expanding in the pressure-application direction X can be constructed by forming in advance slits 222S and 232S extending in the pressure-application direction X at deepest portions of the grooves 222 and 232 V-shaped in cross-section and letting part of a material flow into the slits 222S and 232S at the time of applying pressure on the wire rod S, as shown in FIGS. 10(A) and 10(B).

Although a case where the flat portions 14 are constructed by forming the pressing surfaces 224 and 234 on the outer sides of the grooves 222 and 232 and plastically deforming the wire rod S with the pressing surfaces 224 and 234 has been illustrated in the embodiment, the present invention is not limited to this. For example, the wire rod S can be made rhombic in cross-section by making the maximum widths Mw in the pressure-application perpendicular direction Y of the grooves 222 and 232 V-shaped in cross-section larger than the wire rod S in advance and applying pressure on the wire rod S in a sandwiched state with the grooves 222 and 232 themselves, as shown in FIGS. 10(C) and 10(D). As a result, the flat portions 15 formed by flattening the wire rod S in the pressure-application direction X can be constructed, as compared with the wire rod S before the pressure application in a sandwiched state. Additionally, the flat portions 15 may be defined as extended portions which are formed by pushing and spreading the wire rod S having the dimension Sw in the pressure-application perpendicular direction Y before the pressure application in a sandwiched state toward the outer sides in the pressure-application perpendicular direction Y by Mk. The uneven portion 16 may be formed at the flat portions 15 by the punches 240.

Although a case (see FIG. 3) where the plastic-working region 210A and the trimming region 210B are separately provided in the die 210 has been illustrated in the embodiment, the present invention is not limited to this. For example, the punches 240 and punches 241 may be installed in the first pressure die 220 and the second pressure die 230, and distal end surfaces 240A and 241A of the punches 240 and 241 may double as part of the pressing surfaces 224 and 234 that plastically deform the wire rod S, as shown in FIG. 11(A). In this case, the flat portions 14 are formed by crushing the wire rod S with the distal end surfaces 240A and 241A of the punches 240 and 241. Subsequently, the flat portions 14 are trimmed by moving the punches 240 and 241, as shown in FIG. 11(B). In this manner, the uneven portions 16 can be formed. As a result, a plastic-working region and a trimming region are provided in the same place in the die 210.

For example, cutter blades 248 which follow distal end shapes of the uneven portions 16 are formed in advance on at least one of the first pressure die 220 and the second pressure die 230, as shown in FIG. 12. The cutter blades 248 can trim the uneven portions 16 at the same time as plastic deformation under pressure.

Although a case where the flat portions 14 of the mower cord 10 are trimmed to form the uneven portions 16 in the trimming step (step S109) has been illustrated in the embodiment, the present invention is not limited to this. For example, side walls 250 which follow the shapes of distal ends (ridges) of the uneven portions of the mower cord 10 are prepared in advance in the die 210, and the shape of an edge in a width direction of each of the pressing surfaces 224 and 234 of the first pressure die 220 and the second pressure die 230 is made to coincide with the shape of the corresponding distal end (ridge) of the uneven portions of the mower cord 10, as shown in FIG. 13. In this state, the first pressure die 220 and the second pressure die 230 are moved along the side walls 250. With this movement, spaces surrounded by the pressing surfaces 224 and 234 and the side walls 250 have the shapes of the flat portions 14 with the uneven portions 16, as shown in FIGS. 14(A) to 14(C) and FIGS. 14(D) to 14(F). The uneven portions 16 can be simultaneously formed through plastic deformation.

For example, as in the die 210 shown in FIGS. 15 and 16, the pressing surfaces 224 and 234 that are convex toward an inner side (i.e., toward the wire rod S) in the pressure-application perpendicular direction Y may be constructed. In this case, part of the wire rod S is plastically deformed so as to be pinched by bringing only the pressing surfaces 224 and 234 closer to each other while holding the wire rod S with the grooves 222 and 232 formed in the first pressure die 220 and the second pressure die 230. As a result, the part of the wire rod S is pushed and spread toward the outer sides in the pressure-application perpendicular direction Y, thereby forming the flat portions 14 convex toward the outer sides in the pressure-application perpendicular direction Y, as shown in FIG. 16. The flat portion 14 is repeatedly formed along a longitudinal direction of the wire rod S to form a plurality of flat portions 14. With the shapes of the flat portions 14, the uneven portions 16 that are continuous in the longitudinal direction are simultaneously completed (see FIG. 5).

Although a case in FIG. 1 where the shape of the uneven portion 16 is an arcuate shape convex toward an inner side has been illustrated in the embodiment, various shapes can be selected as the shape of the uneven portion 16. For example, the shape of the uneven portion 16 may be a shape with continuous V-shaped mountains or valleys or a saw blade shape, as shown in FIG. 17(A), or may be an arcuate shape convex toward an outer side, as shown in FIG. 17(B). In this case, working may be performed such that the main body portion 12 includes part of the uneven portion 16, as shown in FIG. 17(C).

Although a case where the uneven portions 16 are formed in a direction changing the width in the pressure-application perpendicular direction Y of the flat portion 14 has been illustrated in the embodiment, the present invention is not limited to this. For example, the uneven portions 16 may be formed by plastically deforming each flat portion 14 such that the flat portion 14 is displaced in the pressure-application direction X, as shown in FIG. 18.

Note that although a case where the plastic-working region 210A and the trimming region 210B are integrally constructed in one die has been illustrated in the embodiment, separate machines (dies) may be used for working.

Although a case where the trimming step is performed after the plastic-working step has been illustrated in the embodiment, the present invention is not limited to this. For example, the trimming step may be performed earlier so as to form uneven portions at an element wire, and the uneven portions may be subjected to the plastic-working step later to be stretched in a diametrical direction.

The present invention is not limited to the above-described embodiment, and various modifications may be made without departing from the spirit and technical ideas thereof.

The invention claimed is:

1. A manufacturing method for a mower cord, comprising:
    extruding a resin raw material and molding the resin raw material into a resin rod having a longitudinal axis;
    after the molding is complete, pressing the molded resin rod between a pair of opposed pressing surfaces of a pressure die which approach the molded resin rod in a direction perpendicular to the longitudinal axis and plastically deforming by cold working at room temperature at least part of the molded resin rod in a direction perpendicular to the longitudinal axis;
    wherein:
    the pressure die includes a pair of opposed side walls oriented transversely to the pressing surfaces and each having an uneven shape;
    the pressing surfaces having outer edges shaped to conform with the uneven shapes of the side walls;
    a site where the at least part of the molded resin rod is cold-worked has a flat portion which is thinner than the molded resin rod before the pressing;
    the flat portion protrudes outwardly in a radial direction of the molded resin rod;
    a plurality of uneven portions which are continuous in a longitudinal direction of the molded resin rod are formed at the flat portion by the side walls such that outer distal edges of the uneven portions conform to the uneven shapes of the side walls;
    the flat portion and the uneven portions are formed simultaneously by the cold working; and
    the pressing is carried out by moving the opposed pressing surfaces relative to the side walls in a pressing direction perpendicular to the longitudinal axis of the molded resin rod.

2. The manufacturing method for the mower cord according to claim 1, wherein a cross-sectional shape of the molded resin rod is changed to an imperfect circular shape by the cold working.

3. The manufacturing method for the mower cord according to claim 1, wherein the flat portion is thinner, as measured in a direction corresponding to the pressing direction, than a thickness of the molded resin rod before the pressing.

4. The manufacturing method for the mower cord according to claim 1, wherein the outer distal edges of the uneven portions form ridges which extend in the longitudinal direction of the molded resin rod.

5. The manufacturing method for the mower cord according to claim 1, further including stretching the resin raw material.

6. The manufacturing method for the mower cord according to claim 1, wherein a cross-section in the direction perpendicular to the longitudinal axis of the molded resin rod has any one of a circular shape, an elliptical shape, a rectangular shape, and a rhombic shape.

7. The manufacturing method for the mower cord according to claim 1, wherein the pressure die includes a pair of opposed pressure dies which respectively define the opposed pressing surfaces, the opposed pressure dies being movable towards one another and relative to the side walls to sandwich the molded resin rod between the opposed pressing surfaces.

8. The manufacturing method for the mower cord according to claim 7, wherein:
    at least one of the pressure dies has a groove which stores the molded resin rod; and
    the molded resin rod is pressed while being held in place by the groove.

9. The manufacturing method for the mower cord according to claim 8, wherein the pressing surface of the one pressure die defines at least part of the groove and comes into contact with the molded resin rod.

10. The manufacturing method for the mower cord according to claim 8, wherein:
    the one pressure die has a pair of outer pressing surfaces disposed at opposite sides of the groove, each outer pressing surface extending towards an adjacent one of the side walls in a direction perpendicular to the longitudinal axis and forming part of the pressing surface of the one pressure die, the outer edges of the pressing surface of the one pressure die being disposed at respective terminal outer ends of the outer pressing surfaces of the one pressure die disposed immediately adjacent the respective side walls; and
    the molded resin rod is pressed by the outer pressing surfaces while being held by the groove to form the flat portion.

11. The manufacturing method for the mower cord according to claim 7, wherein at least one of the pressure dies has a tapered surface which comes into contact with the molded resin rod.

12. The manufacturing method for the mower cord according to claim 1, wherein the pressing and cold working causes accumulation of internal strain in the flat portion.

13. The manufacturing method for the mower cord according to claim 1, further comprising sandwiching the molded resin rod between the opposed pressing surfaces and between the side walls to simultaneously form the flat portion and the uneven portions by the cold working.

14. The manufacturing method for the mower cord according to claim 1, wherein the uneven shapes of the respective side walls of the pressure die and the uneven shapes of the outer edges of the pressing surfaces comprise longitudinally extending undulations.

15. A method of manufacturing a mower cord, said method comprising the steps of:
forming a solid resin rod from a resin raw material, the solid resin rod having a longitudinal axis;
thereafter pressing the solid resin rod between a pair of opposed pressing surfaces of a pressure die which are movable in a pressing direction perpendicular to the longitudinal axis and plastically deforming by cold working at room temperature part of the solid resin rod in a direction perpendicular to the longitudinal axis to form a flat portion that is thinner than the solid resin rod before the step of pressing and cold working, the flat portion protruding outwardly in a radial direction of the solid resin rod;
wherein the step of pressing and cold working, simultaneously with forming the flat portion, forms a plurality of uneven portions along the flat portion with opposed and uneven side walls of the pressure die such that the plurality of uneven portions extend continuously in the longitudinal direction of the solid resin rod and such that outermost edges of the uneven portions conform to the opposed and uneven side walls, wherein outer edges of the pressing surfaces disposed immediately adjacent the respective side walls have shapes which respectively conform thereto; and
wherein the step of pressing and cold working includes moving the opposed pressing surfaces towards the solid resin rod and along and relative to the side walls.

16. The manufacturing method according to claim 15, wherein the pressure die includes a pair of pressure dies which respectively define the opposed pressing surfaces and which pressure dies are movable towards one another to sandwich the molded resin rod between the opposed pressing surfaces.

17. The manufacturing method for the mower cord according to claim 15, wherein the step of pressing and cold working includes sandwiching the molded resin rod between the pressing surfaces and between the side walls to simultaneously form the flat portion and the uneven portions.

* * * * *